(12) United States Patent
Carpenter et al.

(10) Patent No.: US 10,764,269 B2
(45) Date of Patent: *Sep. 1, 2020

(54) METHOD AND SYSTEM FOR CREATING A UNIQUE IDENTIFIER

(71) Applicant: Visa Europe Limited, London (GB)

(72) Inventors: Paul Michael Carpenter, London (GB); Jonathan Paul Sumpster, London (GB); Andrew Paul Thompson, London (GB); Christopher Ian Abrathat, London (GB); Jonathan Rusca, London (GB); Jean-Christophe Gilbert Lacour, London (GB); Michael Ronald Philpotts, London (GB)

(73) Assignee: Visa Europe Limited, London (GB)

(*) Notice: Subject to any disclaimer, the term of this patent is extended or adjusted under 35 U.S.C. 154(b) by 0 days.

This patent is subject to a terminal disclaimer.

(21) Appl. No.: 16/283,459

(22) Filed: Feb. 22, 2019

(65) Prior Publication Data

US 2019/0190902 A1    Jun. 20, 2019

Related U.S. Application Data

(63) Continuation of application No. 14/884,153, filed on Oct. 15, 2015, now Pat. No. 10,257,178, which is a
(Continued)

(30) Foreign Application Priority Data

Apr. 15, 2013   (GB) .................................. 1306835.8

(51) Int. Cl.
*H04L 29/06*  (2006.01)
*G06F 21/31*  (2013.01)
*G06Q 20/40*  (2012.01)

(52) U.S. Cl.
CPC .............. *H04L 63/08* (2013.01); *G06F 21/31* (2013.01); *G06Q 20/4014* (2013.01)

(58) Field of Classification Search
None
See application file for complete search history.

(56) References Cited

U.S. PATENT DOCUMENTS 5,790,785 A * 8/1998 Klug ...................... G06F 21/41
726/11
6,496,855 B1   12/2002 Hunt et al.
(Continued)

FOREIGN PATENT DOCUMENTS

WO            231679 A1    4/2002

OTHER PUBLICATIONS

International Search Report and Written Opinion dated Sep. 19, 2014 for PCT Application No. PCT/ GB2014/051185.

*Primary Examiner* — Piotr Poltorak
(74) *Attorney, Agent, or Firm* — Kilpatrick Townsend & Stockton LLP

(57) ABSTRACT

Method and apparatus for creating a second unique identifier for a user in a second system based on a first unique identifier for a user in a first system. A first authentication process is initiated based on a first unique identifier associated with the user in the first system. Responsive to the user successfully authenticating during the first authentication process, the second unique identifier for a user in the second system is generated. The second unique identifier is based on user data associated with the first unique identifier in the first system, and the second unique identifier is different from the first unique identifier.

20 Claims, 21 Drawing Sheets

Related U.S. Application Data continuation of application No. PCT/GB2014/051185, filed on Apr. 15, 2014.

(56) References Cited

U.S. PATENT DOCUMENTS

| | | | |
|---|---|---|---|
| 6,944,677 B1 | 9/2005 | Zhao | |
| 6,985,946 B1* | 1/2006 | Vasandani | G06F 21/31 |
| | | | 707/999.009 |
| 7,322,043 B2* | 1/2008 | Letsinger | G06F 21/31 |
| | | | 726/17 |
| 7,890,997 B2 | 2/2011 | Walker | |
| 8,407,769 B2 | 3/2013 | Salmela | |
| 8,554,685 B2* | 10/2013 | Patterson | G06Q 20/206 |
| | | | 705/44 |
| 9,916,010 B2* | 3/2018 | Harris | G06F 3/017 |
| 2002/0120867 A1 | 8/2002 | Mitchell | |
| 2003/0050911 A1 | 3/2003 | Lucovsky | |
| 2003/0163737 A1 | 8/2003 | Roskind | |
| 2003/0220994 A1 | 11/2003 | Zhu | |
| 2003/0236991 A1* | 12/2003 | Letsinger | G06F 21/31 |
| | | | 726/19 |
| 2004/0250118 A1 | 12/2004 | Andreev | |
| 2006/0174104 A1 | 8/2006 | Crichton | |
| 2007/0025302 A1 | 2/2007 | Zhang | |
| 2007/0125840 A1 | 6/2007 | Law | |
| 2007/0136573 A1 | 6/2007 | Steomberg | |
| 2007/0220007 A1 | 9/2007 | Narita | |
| 2008/0104657 A1 | 5/2008 | Furukawa | |
| 2009/0017789 A1 | 1/2009 | Thomas | |
| 2011/0105220 A1 | 5/2011 | Hill | |
| 2011/0119747 A1 | 5/2011 | Lambiase | |
| 2011/0302631 A1 | 12/2011 | Sureshchandra | |
| 2012/0184248 A1 | 7/2012 | Speede | |
| 2013/0036458 A1 | 2/2013 | Liberman | |
| 2013/0117646 A1 | 5/2013 | Hansen | |
| 2013/0185311 A1 | 7/2013 | MacMillan | |
| 2013/0254852 A1 | 9/2013 | Islam | |
| 2014/0143037 A1 | 5/2014 | Zhou | |
| 2014/0337090 A1* | 11/2014 | Tavares | G06Q 30/0201 |
| | | | 705/7.29 |

\* cited by examiner

Enter the details of your card

Card Number
Cardholder Name
Expiry Date
Security Number

Billing Address:
Address line 1
Address line 2
City/Town
County
Post Code

Activation Complete

XXXX XXXX XXXX 1234
Mr AN Other    Exp 01/01

Back to Homepage

METHOD AND SYSTEM FOR CREATING A UNIQUE IDENTIFIER

CROSS-REFERENCE TO RELATED APPLICATIONS

This application is a continuation of U.S. patent application Ser. No. 14/884,153 filed Apr. 15, 2014, which is a continuation of International Application No. PCT/GB2014/051185, filed Apr. 15, 2014, which claims the benefit of Foreign Application No. GB 1306835.8, filed Apr. 15, 2013. The above-referenced patent applications are all herein incorporated by reference in their entirety.

BACKGROUND OF THE INVENTION

Field of the Invention

The present invention relates to a system and method for creating a unique identifier for a user.

Description of the Related Technology

In data communications systems, credentials, such as a unique identifier and a password, are required to authenticate a user. Once authenticated, a user may, for example, access data, or authorize access to data for another system.

A unique identifier may be provided to a user. However, it can be the case that the unique identifier is difficult to remember and/or laborious to enter into a user terminal in the communications system. This in turn makes the system less efficient. Moreover, a unique identifier, upon creation, may be entered incorrectly. This makes the unique identifier inoperative, as any subsequently entered unique identifier, lacking any errors, will not correspond to the stored, erroneous, unique identifier. A method to overcome this requires a user to enter a unique identifier twice, however this is laborious.

There is therefore a desire for improvements in creating unique identifiers.

SUMMARY

In accordance with at least one embodiment, methods, devices, systems and software are provided for supporting or implementing functionality to transmit credentials.

This is achieved by a combination of features recited in each independent claim. Accordingly, dependent claims prescribe further detailed implementations of various embodiments.

According to a first embodiment, there is provided a method of creating a second unique identifier for a user in a second system based on a first unique identifier for a user in a first system, the method comprising: initiating a first authentication process based on a first unique identifier associated with the user in the first system; and responsive to the user successfully authenticating during the first authentication process: generating, based on at least a part of user data associated with the first unique identifier in the first system, at least a part of the second unique identifier for a user in the second system, the second unique identifier being different from the first unique identifier.

According to a second embodiment, there is provided apparatus for creating a second unique identifier for a user in a second system based on a first unique identifier for a user in a first system, the apparatus configured to: initiate a first authentication process based on a first unique identifier associated with the user in the first system; and responsive to the user successfully authenticating during the first authentication process: generate, based on at least a part of user data associated with the first unique identifier in the first system, at least a part of the second unique identifier for a user in the second system, the second unique identifier being different from the first unique identifier.

According to a third embodiment, there is provided a computer program arranged to perform a method of creating a second unique identifier for a user in a second system based on a first unique identifier for a user in a first system, the method comprising: initiating a first authentication process based on a first unique identifier associated with the user in the first system; and responsive to the user successfully authenticating during the first authentication process: generating, based on at least a part of user data associated with the first unique identifier in the first system, at least a part of the second unique identifier for a user in the second system, the second unique identifier being different from the first unique identifier.

According to a fourth embodiment, there is provided a method of creating a second unique identifier for a user in a second system using a first unique identifier for a user in a first system, the method comprising: conducting a first authentication process based on a first unique identifier associated with the user in the first system; and responsive to the user successfully authenticating during the first authentication process: receiving the second unique identifier, the second unique identifier having been generated at least in part based on at least a part of user data associated with the first unique identifier in the first system, the second unique identifier being different from the first unique identifier; and receiving user input confirming whether the generated second unique identifier is to be used in the second system.

Further features and advantages will become apparent from the following description of embodiments, given by way of example only, which is made with reference to the accompanying drawings.

BRIEF DESCRIPTION OF THE DRAWINGS

Systems, apparatuses and methods will now be described as embodiments, by way of example only, with reference to the accompanying figures in which:

FIGS. 9a, 9b, 9c, 9d and 9e show representations of content displayed to a user during the process shown in FIG. 8;

FIGS. 13a, 13b, 13c, 13d, 13e and 13f show representations of content displayed to a user during the process shown in FIG. 12.

Some parts, components and/or steps of the embodiments appear in more than one Figure; for the sake of clarity the same reference numeral will be used to refer to the same part, component or step in all of the Figures.

DETAILED DESCRIPTION OF CERTAIN INVENTIVE EMBODIMENTS

Embodiments are applicable to many types of communication network. Accordingly FIGS. 1 and 2 will be used to illustrate an embodiment in a generalized communications network. Following on from this, FIGS. 3 to 14 will be used to illustrate embodiments where the communications network comprises a payment processing system.

Figure 1:
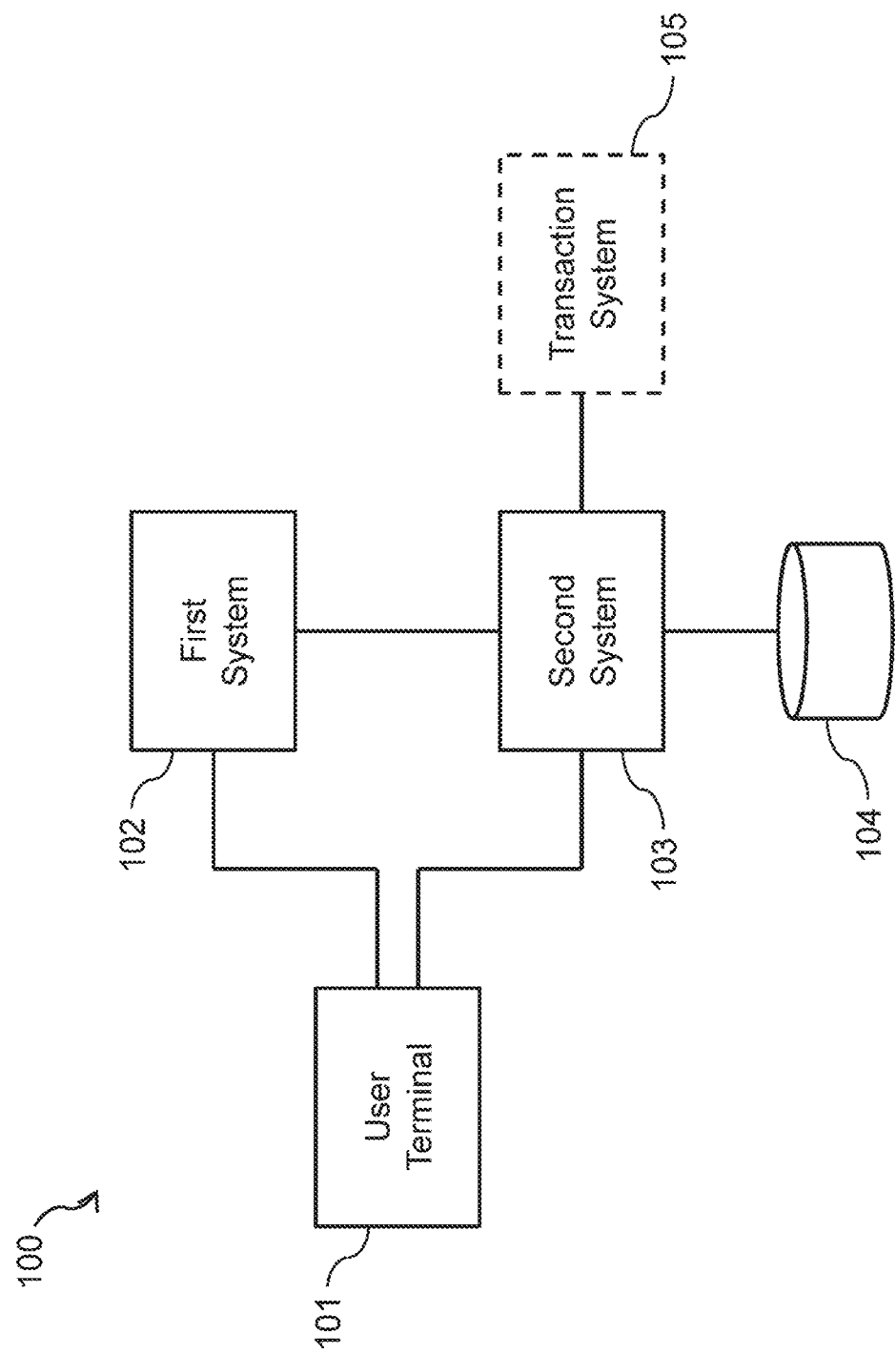
FIG. 1 is a schematic diagram showing a data communications network in accordance with embodiments.

FIG. 1 shows a data communications network 100 within which embodiments may be practiced. In the data communications network 100, a user terminal 101 communicates with one or more systems, described below, via the data communications network 101. The user terminal 101 may comprise, for example, a personal computer, a tablet computer device, a smartphone, smart TV or other Internet-connected device. The user terminal 101 may be equipped with a browser which allows the user to access an online system. The user terminal 101 may be associated with a user, operating the user terminal 101, as such, authentication steps described below may comprise authentication of the user, via the user terminal 101.

The user terminal 101 is connected, via the data communications network 100, to a first system 102, and to a second system 103. The second system 103 is in turn connected to both the user terminal 101 and the first system 102. The second system 103 may comprise or, as shown, be connected to, a store or memory 104 such as a database.

In addition, data communications network 100 may contain one or more transaction systems, shown as transaction system 105. These transaction systems 105 may be connected to the second system 103.

Figure 2:
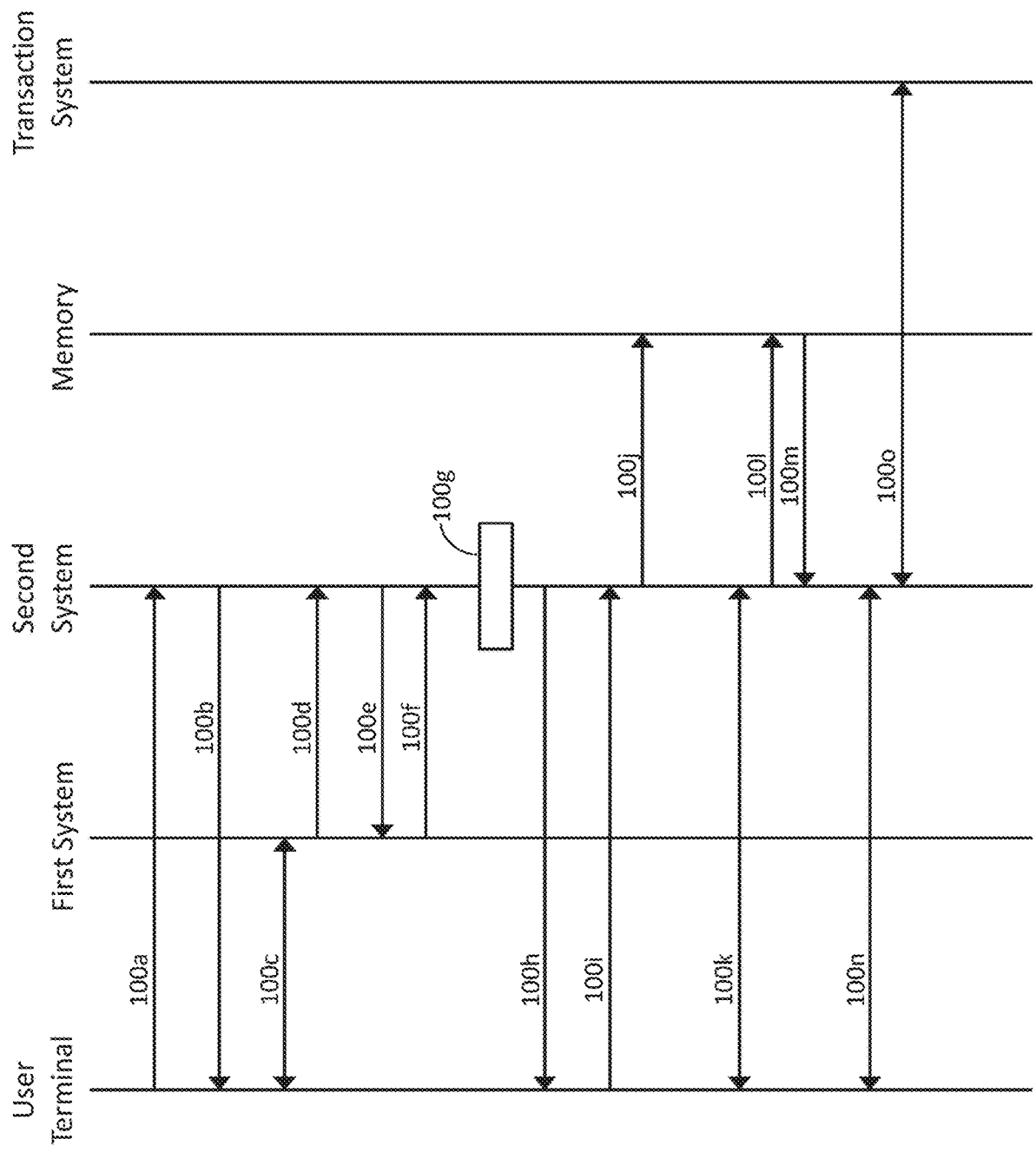
FIG. 2 is a schematic flow diagram showing the flow of data within the data communications network in accordance with embodiments.

The use of the data communications network 100 and the elements therein will now be described, according to an embodiment, with reference to FIG. 2. In this embodiment, the second system 103 creates a second unique identifier for a user in the second system 103 based on a first unique identifier for a user in the first system 102.

Prior to the creation of the second unique identifier, the user of the user terminal 101 may, for example, request that the creation process is instigated. This is shown as step 100a in FIG. 2, and may include, for example, the user accessing a webpage provided by the second system 102.

In response to this request, the second system 103 initiates, in step 100b, a first authentication process based on a first unique identifier associated with the user in the first system. The authentication process is shown as step 100c, and in this embodiment, the first authentication process 100c is conducted between the user and the first system.

The first unique identifier, used in the first authentication process 100c, may be associated with a first system password to define credentials for a user in the first system 102. The first authentication process 100c may therefore use at least the first unique identifier to authenticate the user.

The result of the first authentication process 100c may then be communicated to the second system 103. In this embodiment, this is shown in step 100d as a direct communication between the first system 102 and the second system 103. However in other embodiments, the communication of the result of the authentication may be routed, for example, via the user terminal. This may be performed using, for example, an encrypted or signed token.

The second system 103 may then request, in step 100e, user data corresponding to the authenticated user from the first system 102. The second system 103 may receive, in step 100f, user data associated with the first unique identifier from the first system 102. While steps 100d and 100f are shown separately, it will be appreciated that they may be combined, and step 100e omitted. That is, the first system 102, upon successful authentication of the user using the first authentication process, may send the user data to the second system 103 without a request from the second system 103 being required.

Steps 100e and 100f may be performed responsive to the user successfully authenticating during the first authentication process. However, they may also be performed as a part of more general provision of user data from the first system 102 to the second system 103 which is independent of any authentication of users; for example, as a bulk retrieval of user data for many users.

In addition, responsive to the user successfully authenticating during the first authentication process, the second system 103 generates, in step 100g, based on at least a part of user data associated with the first unique identifier in the first system 102, at least a part of the second unique identifier for a user in the second system 103. This second unique identifier is different from the first unique identifier, and may, for example, comprise a username to be associated with a second system password to define credentials for a user in the second system.

Following on from the generation of the second unique identifier, the second system 103 may, in step 100h, send the generated second unique identifier to the user. The user may subsequently decide to use the generated second unique identifier, and send an appropriate response. Therefore, in step 100i, the second system 103 receives user input confirming that the generated second unique identifier is to be used. Based on the user input, the second system 103 may, in step 100j, activate the generated second unique identifier in the second system 103. This activation may, as shown, comprise storing the second unique identifier in memory 104, however any other form of activation is conceived. Once activated, the second unique identifier may be available for use in authenticating the user with the second system 103 as will be described below.

In the alternative, the user may wish to not use the generated second unique identifier, and may therefore edit or replace the second unique identifier, sending the edited second unique identifier to the second system 103. Accordingly, in step 100i the second system 103 may receive user input from the user, this user input indicating that the generated second unique identifier is not to be used and providing a different, user-defined second unique identifier. Based on this user input, the second system may again activate, in step 100j, the user-defined second unique identifier.

In some embodiments, the user input identifying a password to be associated with the second unique identifier may be requested in step 100h and received in step 100i.

In step 100i, the second system 103 may receive a plurality of elements of user data associated with the first unique identifier from the first system 102. One or more elements of the retrieved user data may be stored, in step 100j (previously described in association with the activation of the second unique identifier), in the memory 104. As such, the user data, in being stored, may be considered to be activated itself, along with the second unique identifier. The stored at least one or more elements of the retrieved user data, may be other than, i.e. different to, the at least part of the user data used to generate the second unique identifier, in the second system. These stored elements may nevertheless be associated with the first unique identifier.

After the generating of the second unique identifier and any of the other steps associated therewith (i.e. steps 100a to 100j), the second system 103 may conduct a second authentication process, shown as step 100k, in which a user is authenticated based, at least, on the second unique identifier. Responsive to the second authentication process 100k being successful, the second system 103 may allow access to the second system. This access may take many forms, for example as shown by step 100n, the user terminal may be allowed to access the second system 103. Alternatively or additionally, as illustrated by step 100o, a further system, such as transaction system 105 may be allowed to access the second system 103. In being allowed to access the second system 103, any interested party may be allowed access to, or be sent, user data stored in the memory 104.

As such, the first unique identifier may be used to authenticate the user with the first system 102, after which user data may be retrieved from the first system 102 and stored in the second system's memory 104. Moreover, a part of the user data may be used to generate a second unique identifier for use in authenticating with the second system 103. Authentication with the second system 103, using the second unique identifier, may be used to authorize access to the data stored in the second system 103. Consequently, the user need only use the first unique identifier once in an authentication process to enable access to user data, after which a generated second unique identifier may be used, in a second authentication process, to enable access to the user data.

In embodiments, the first unique identifier may be stored in the second system (i.e. in memory 104). The first unique identifier may be used to allow a transaction involving the first unique identifier to be initiated using the second system 103. To enable this, the first unique identifier may comprise a primary account number (PAN) associated with a financial instrument. In such embodiments, the first system 102 may comprise an issuing bank data processing system; the second system 103 may similarly comprise a payment wallet data processing system; and/or the transaction system 105 may comprise a payment processing system. Furthermore, the user data received from the first system 102 may include verification data elements used in a transaction, such as: a billing name; one or more elements of a billing address; a card security code (CSC); card verification data (CVD); a card verification value (CVV or CVV2); a card verification value code (CVVC); a card verification code (CVC or CVC2); a verification code (V-code or V code); a card code verification (CCV); a signature panel code (SPC) a start date for a financial instrument; and an expiry date for a financial instrument.

In these embodiments, the second unique identifier, along with a password if required, may be used to authorize use of the first unique identifier—a PAN—thereby enabling the second system to function as a digital wallet and authorize transactions. Beneficially, the user may authenticate with the digital wallet using the second unique identifier, which may be easier to remember and/or enter than the PAN. Nevertheless, the second unique identifier may be generated for the user, thereby simplifying the process of associating an appropriate second unique identifier (i.e. a username) with the user data.

In some embodiments, the first unique identifier comprises a telephone number. Since telephone numbers are often difficult to remember, and yet form useful unique identifiers, this provides the advantage that a user may use a telephone number to authenticate once, with the first system 102, after which the second unique identifier is generated—the second unique identifier being easier to remember.

The part of user data associated with the first unique identifier in the first system, from which at least a part of the second unique identifier is identified, may comprise a contact data element. For example, the part of user data associated with the first unique identifier in the first system, from which at least a part of the second unique identifier is identified, may comprise an email address. Therefore, an email address, which is known to be correct—based on the assumption that the user will be receiving email from the first system 102—is provided to the user, thereby removing the need for the user to have to enter, and in many cases confirm, the email address. This offers substantial savings in time and reduces errors.

While the above has been described in more general terms, a more specific description of an embodiment being used with a financial transaction system will now be provided.

Figure 3:
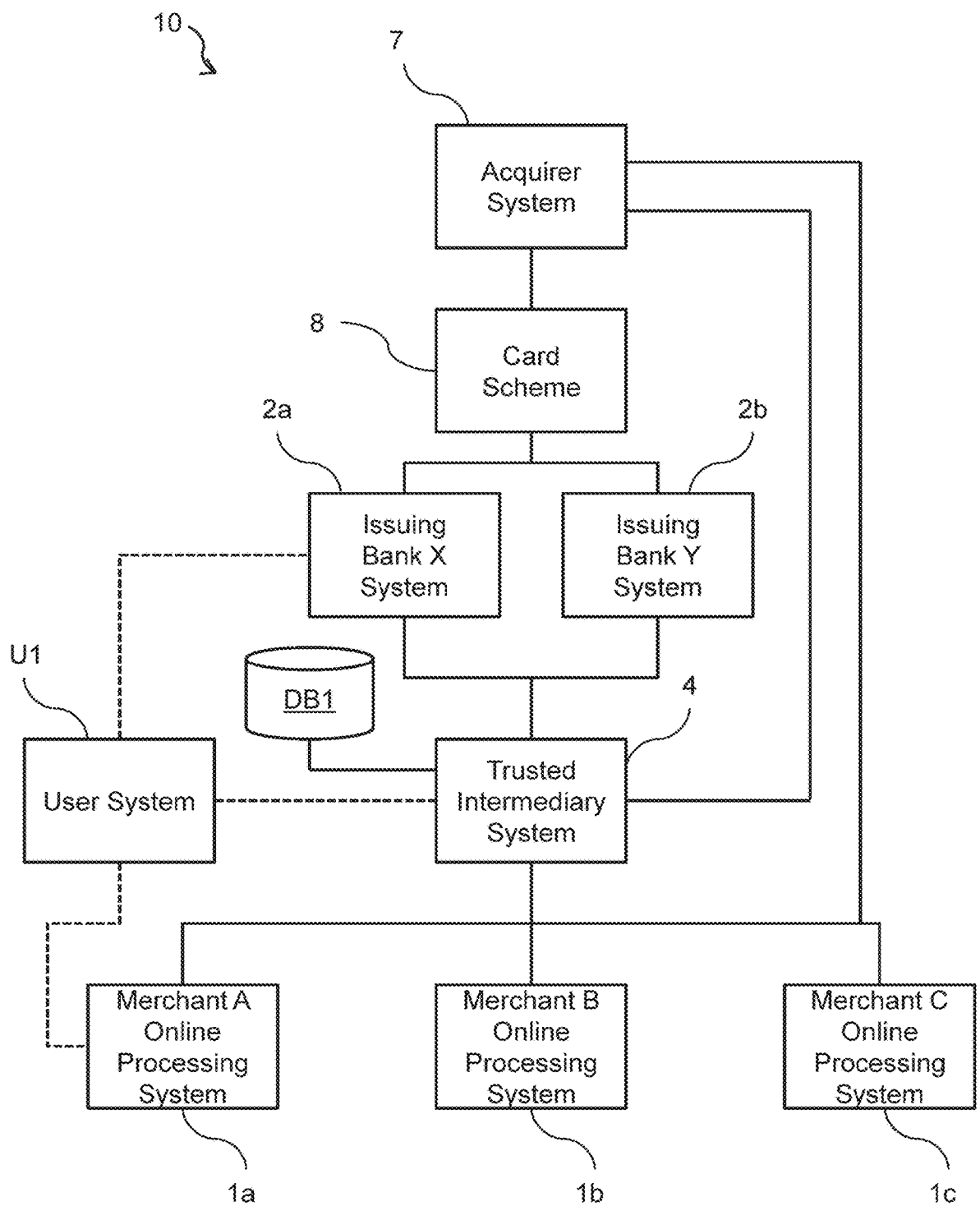
FIG. 3 is a schematic diagram showing a payment system in accordance with embodiments.
Figure 4:
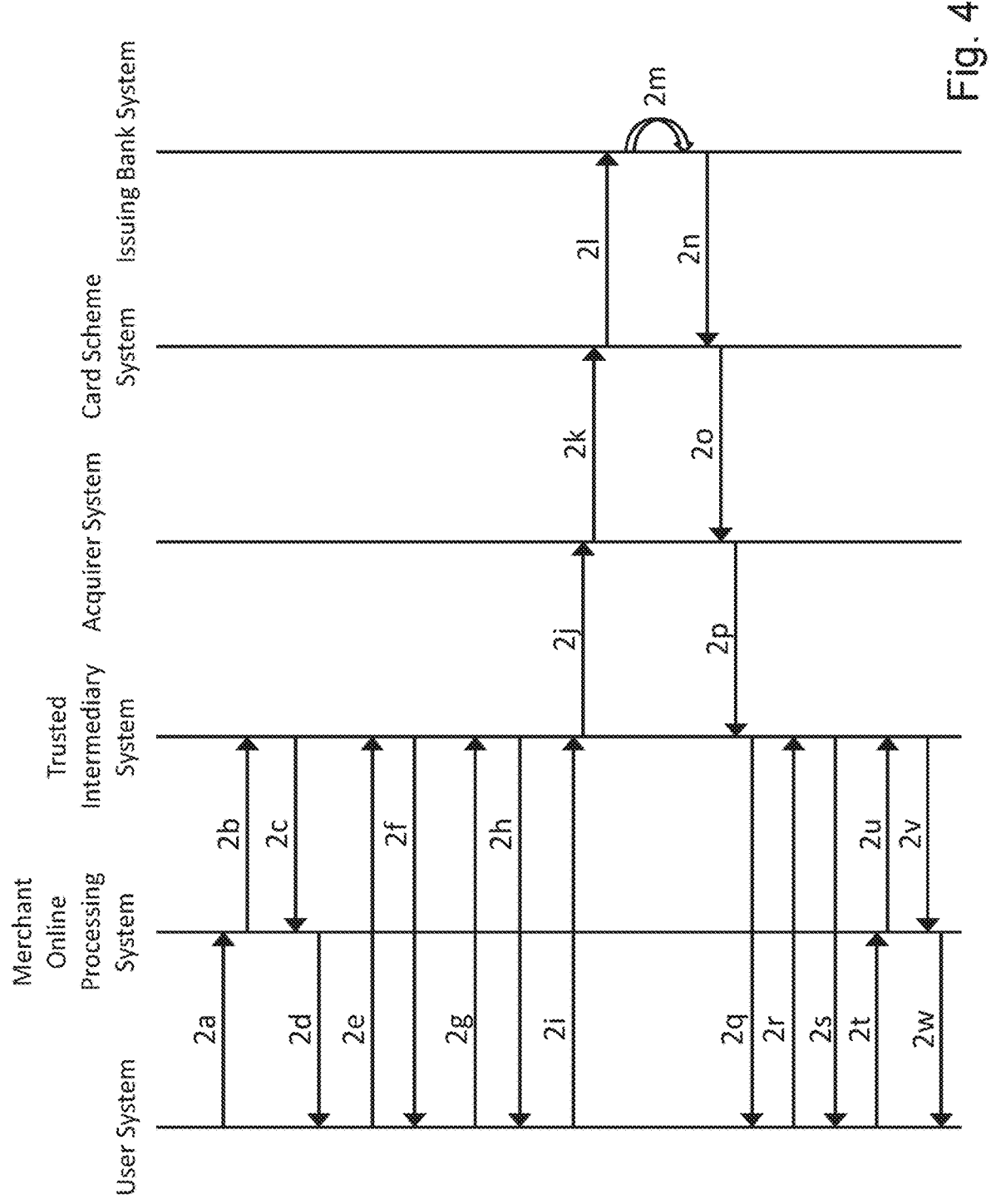
FIG. 4 is a schematic flow diagram showing the flow of data within the payment system during a transaction in accordance with embodiments.

FIG. 3 shows an example of a payment system 10 according to embodiments, in which a user, making use of an online device, referred to as user system U1, has one or more accounts (e.g. a current account or checking account) with one or more of a plurality of different issuing banks 2a, 2b. The user system U1 is analogous to the user terminal 101 described above.

The user system U1 may comprise a personal computer, a tablet computer device, a smartphone, smart TV or other Internet-connected device, for example, equipped with a browser which allows the user to access an online merchant shopping website provided by a merchant online processing system 1a, 1b or 1c. The user system U1 is connected via data communications links via which the user is able to enter into a transaction with one of a plurality of online merchant systems 1a, 1b or 1c when purchasing goods over the Internet. The online merchant systems 1a, 1b and 1c are equipped with website software that enables the user to select a payment method for the purchase of their selected goods. Each merchant online processing system 1a, 1b and 1c has been modified to include an option to pay using a trusted intermediary system, this identifying a payment request via a trusted intermediary system 4—which corresponds to the second system 103 above.

The trusted intermediary system 4 holds data in a database DB1, equivalent to memory 104 above. The data may comprise details corresponding to merchants 1a, 1b and 1c and issuing banks 2a and 2b that have registered with the trusted intermediary system 4. The database DB1 also stores data identifying user records, referred to herein as "digital wallets" accessible via the trusted intermediary system 4. The digital wallet stores activated credentials associated with a user's financial instruments issued by the issuing banks 2a and 2b. The credentials may include a unique identifier such as a payment card number or Primary Account Number (PAN). The credentials may also include verification data elements, such as billing address, payment card expiry date, a card security code (CSC) such as a card verification value (CVV) or the like. By being activated the credentials are available for use.

The database may also store authentication data associated with each wallet. This authentication data may be used to enable a user to authenticate with the wallet and thereby be able to authorize transactions conducted using the credentials stored within the wallet. The digital wallet may also store other data, for example contact data which may be used by the provider of the digital wallet to provide alerts and notifications to the user.

The issuing banks 2a and 2b—which each may operate in the role of the first system 102—issue the financial instruments associated with the credentials stored in the digital wallet. These financial instruments are linked to an account held at the issuing bank, and use of the financial instrument enables transactions to be conducted on behalf of the account. A physical payment card (i.e. debit or credit card) is not necessary, and the issuing bank may not be required to issue a physical card in conjunction with the card number or other credentials.

Transactions may be routed back to the issuing bank that issued the financial instrument via an acquirer system 7 and card scheme payment processing system 8. The merchants, acquirer system 7 and/or card scheme payment processing system 8 may make up a transaction system, which performs the same role as the transaction system 105 as described above. As shown in FIG. 3 the trusted intermediary system may be connected to the acquirer system, as may the merchants 1a, 1b and 1c. Transaction data may therefore be provided from the trusted intermediary system 4 directly to the acquirer system 7, or may be provided to the merchant systems 1a, 1b and 1c, and from there to the acquirer system 7.

While not shown, one or more Payment Service Providers (PSPs) or Internet Payment Service Providers (IPSPs)—collectively IPSPs—may be included in the system 10. These IPSPs may be provided by operators distinct from either the operators of the merchant systems or the acquirer system. Nevertheless, for the purposes of this description, they may be considered to be a part of one or both of the acquirer system or the merchant systems, and accordingly data provided to these systems may be routed through an IPSP.

In some embodiments, the payment data may not be routed through the whole transaction system. For certain transactions, for example where the acquirer system and the issuing bank system are provided by the same operator, the card scheme 8 may not be involved in any transaction. Such transactions are sometimes called "on-us" transactions. Other transactions, may also not use all the elements shown, or may use alternative elements. For example, domestic processing may be used. Domestic processing is the processing of payment transactions by an entity other than a card schemes, and is used to enable local (country specific) card usage. A domestic processing element, not shown, may therefore be used for certain transactions.

Payment Processing Using a Digital Wallet

FIGS. 4, 5a, 5b, 5c and 5d illustrate a payment authorization request processing in accordance with some embodiments. In the steps described below in relation to FIGS. 4 and 5, the user already has a user record or account, also referred to herein as a "digital wallet", held by the trusted intermediary system 4. The digital wallet includes credentials associated with one or more transactional accounts held by the user.

Prior to step 2a, the user has completed their shopping experience with an online merchant using the merchant online processing system, has initiated checkout to purchase one or more items, and has proceeded to a virtual checkout, according to conventional methods available through commonly available shopping cart and checkout software packages such as are known to the skilled person.

The online merchant's website prompts the user to select a payment option for the purchase. This may be displayed to the user in a similar manner to that shown in FIG. 5a. In embodiments, the options include options to pay by credit or debit card, by entering their card details directly into the merchant website, or to opt for payment using a digital wallet via the trusted intermediary system. Note that in FIG. 5a, and in various ones of the following figures, the trusted intermediary system is referred by the initials "TIS"—so for example, the button labelled "Pay by TIS" corresponds with the option to pay via the trusted intermediary system.

At step 2a, the user selects the option to pay using their digital wallet (i.e. pay by TIS) and the user system U1 transmits a corresponding request to the merchant online processing system 1.

At step 2b, the merchant online processing system 1 transmits a message to the trusted intermediary system 4 including for example an amount of payment for the one or more items, a merchant account identifier and an identifier for the order.

At step 2c, the trusted intermediary system 4 transmits to merchant online processing system 1 a Uniform Resource Locator (URL) of a login page for the digital wallet service and the merchant online processing system 1, in step 2d, transmits the Uniform Resource Locator (URL) in e.g. an iFrame, the content of which is to include the digital wallet service login page, which the user system 1 retrieves from the trusted intermediary system 4 at steps 2e and 2f. The iFrame is used to embed the login page for the digital wallet service in the online merchant's payment webpage. The login page may be displayed to the user in the iFrame in a similar manner to that shown in FIG. 5b.

At step 2g, after the user enters their digital wallet authentication data, for example a username and password, into the login page, the user system U1 transmits the entered details to the trusted intermediary system 4.

Figure 5A:
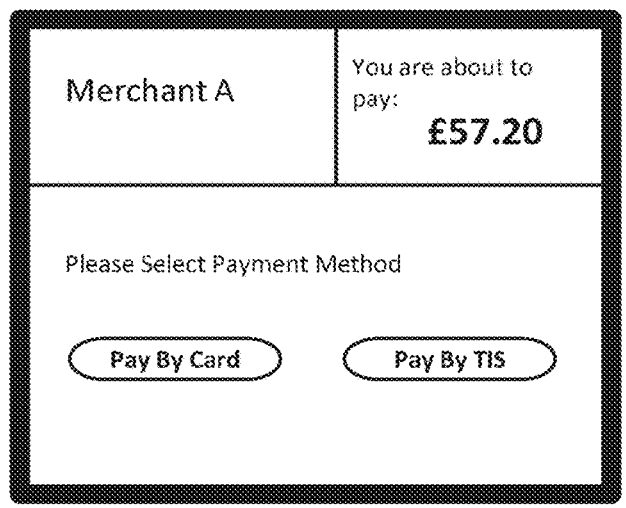
FIGS. 5a, 5b, 5c and 5d show representations of content displayed to a user during the process shown in FIG. 4.
Figure 5B:
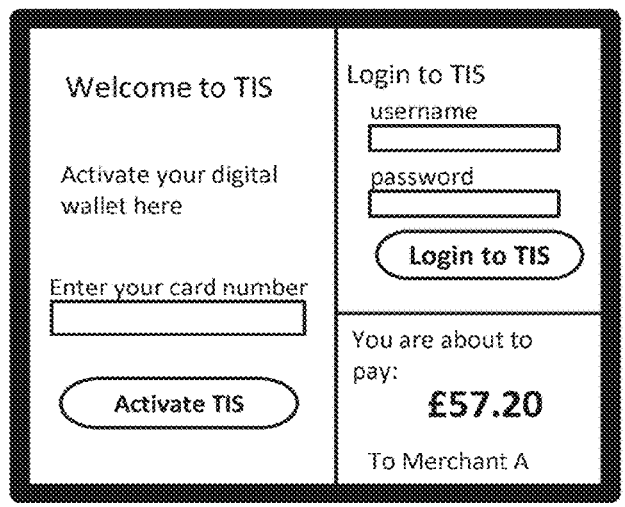
Figure 5C:
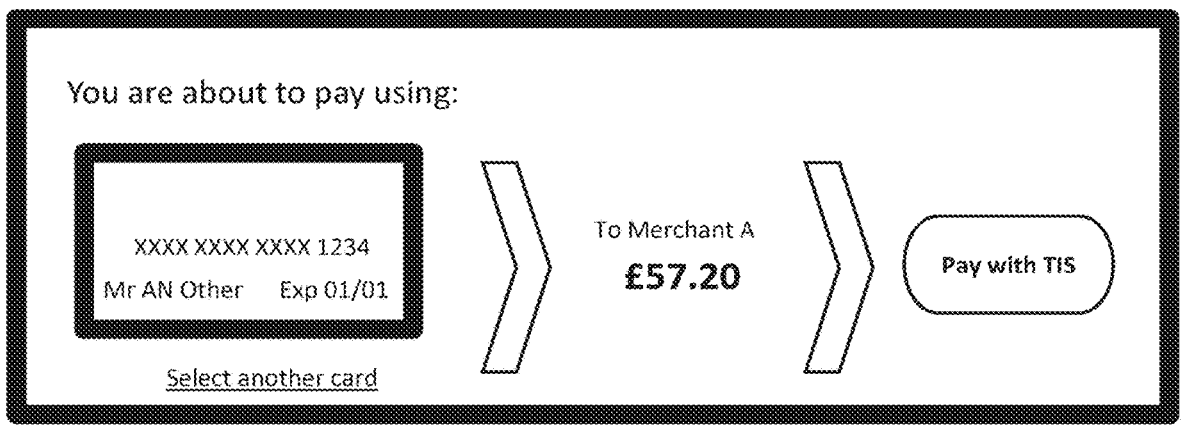

At step 2h, the trusted intermediary system 4 authenticates the user based on the digital wallet authentication data received at step 2g and, following successful authentication, transmits a payment option selection request to the user system U1. The payment option selection request may include a default payment option identifier with, if required the option to change the payment option used such as shown in FIG. 5c. Alternatively a list of payment options may be presented for one to be selected. Each payment option will be associated with an activated set of credentials, i.e. an activated card, stored in the digital wallet.

At step 2*i*, after the user has confirmed the default payment option and/or selected a payment option from the displayed list and confirmed they wish to proceed with the payment, the user system U1 transmits a confirmation message to the trusted intermediary system 4.

At steps 2*j*, 2*k* and 2*l*, the trusted intermediary system 4 transmits a payment authorization request to the issuing bank system 2 via the acquirer system 7 and the card scheme processing system 8. The payment authorization request includes a unique identifier, such as a PAN, and associated verification data elements, such as an expiry date and a card security code which have been retrieved from the digital wallet. The payment authorization request also includes details of the merchant and the payment amount. The request may be routed through the acquirer system and the card scheme system in ways known in the art.

At step 2*m*, issuing bank system 2 receives and processes the payment authorization request. The issuing bank system 2 may generate an authorization code indicating that it has authorized the payment request.

At steps 2*n*, 2*o* and 2*p*, the issuing bank system 2 transmits a payment authorization response to the trusted intermediary system 4 via the card scheme processing system 8 and the acquirer system 7.

Figure 5D:
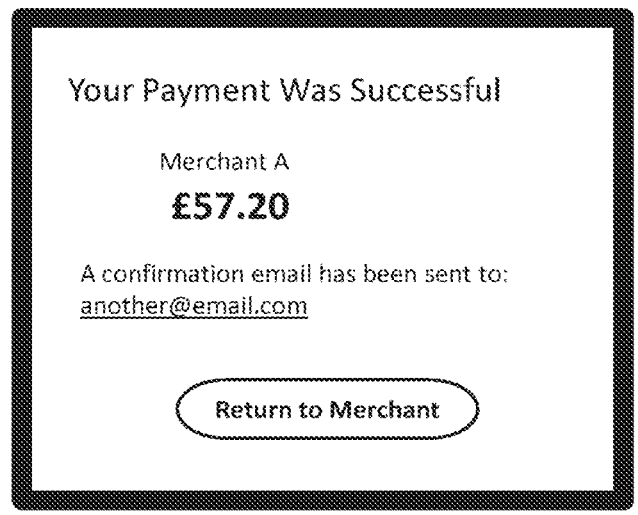

At step 2*q*, after receiving the payment authorization response, the trusted intermediary system 4 transmits an appropriate payment authorization confirmation to the user system in step 2*q*, an example of which is shown in FIG. 5*d*.

The user may then select to leave the trusted intermediary system and return to the merchant web systems. Accordingly, the user provides input in step 2*r* which upon receipt by the trusted intermediary causes the trusted intermediary to send, in step 2*s*, the user system U1 data which causes the user system U1 to return to the merchant webpage. Subsequently, in step 2*t*, the user system U1 contacts the merchant, indicating that the TIS payment is complete. The merchant may contact the trusted intermediary system in step 2*u* to confirm the authorization of the payment, a response being received from the trusted intermediary system in step 2*v*. The merchant may finally send, in step 2*w*, a confirmation of purchase to the user system U1. The transaction may subsequently be settled by any mechanism known in the art.

Digital Wallet Creation and Activation of Credentials

Embodiments have been described above in which the user has already created a digital wallet at the trusted intermediary system 4 and activated a set of credentials, i.e. credentials, stored within it. Embodiments will now be described for creating a digital wallet at the trusted intermediary system 4, and activating credentials to be stored within it.

The wallet may be created and/or credentials may be activated in a number of ways. First, the digital wallet may be created via a banking website, which may then cause credentials to be activated within the new digital wallet. This will be described with reference to FIGS. 6 and 7. Alternative methods include creating/activating by accessing the trusted intermediary system 4 directly, and by creating/activating during a transaction. These are described in FIGS. 8 to 13. In the latter two cases, the process may be performed using a first activation mode or a second activation mode, analogous to the first and second activation modes described above.

Digital Wallet Activation Via Online Banking Website

Figure 6:
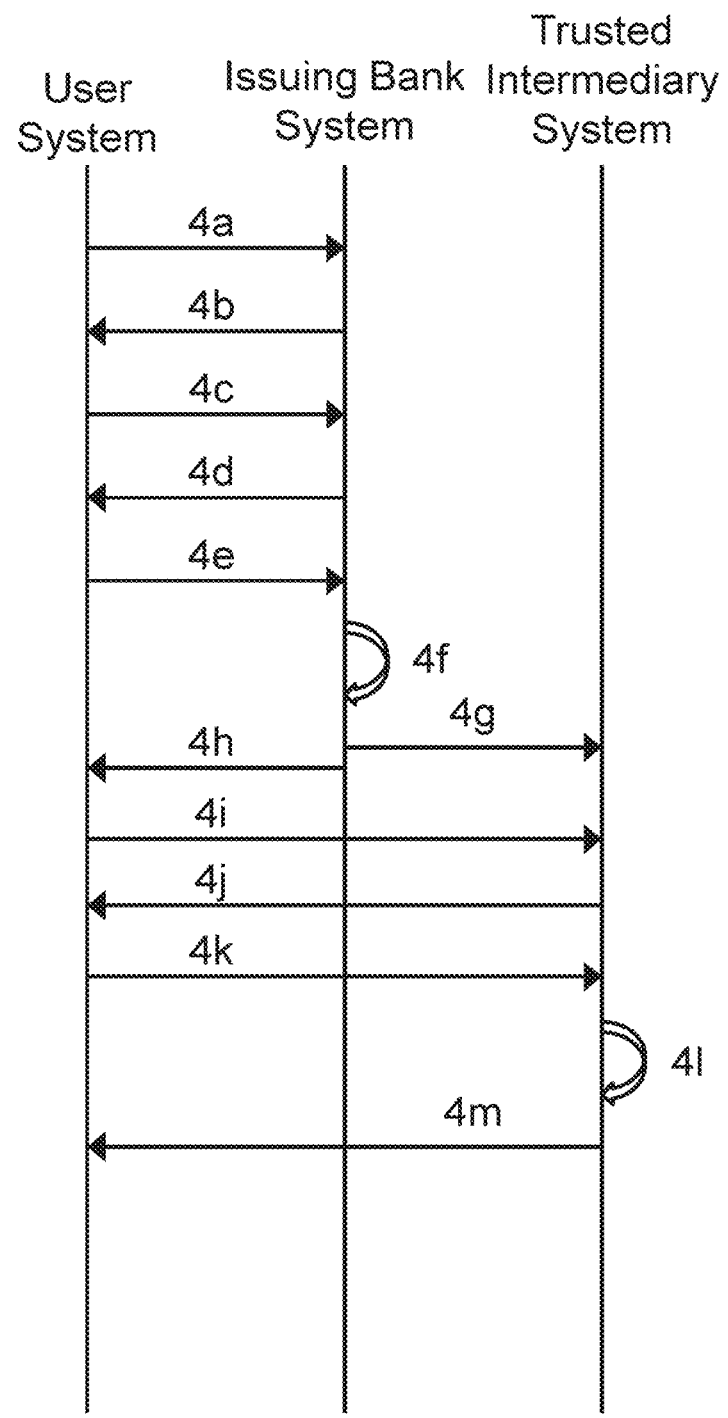
FIG. 6 is a schematic flow diagram showing the flow of data within the payment system for activation of credentials via a bank in accordance with embodiments.

In embodiments depicted in FIGS. 6 and 7, a user creates their digital wallet and activates credentials via their online banking website. In these embodiments, the user activates the digital wallet before any transaction to pay with the digital wallet is initiated.

At step 4*a*, the user enters the URL of the online banking login webpage associated with their online banking service into their browser, or otherwise accesses their online banking login page. Alternatively, the user may use specific application software, such as a smartphone application, to access their online banking system.

At step 4*b*, the user system U1 retrieves the online banking login webpage, which may prompt the user to enter their online banking credentials, including a username such as a customer number, and one or more of password, memorable personal data, a Personal Identification Number (PIN), generated data such as a onetime password generated using a payment card and a card reader, or any suitable mechanism. The interface between the user system U1 and the issuing bank system 2 may be configured according to an online banking protocol.

At step 4*c*, the user enters their online banking credentials into the online banking login webpage and the user system U1 transmits the entered online banking credentials to the issuing bank system 2.

At step 4*d*, following successful authentication of the user based on the entered online banking credentials, the issuing bank system 2 redirects the user to a webpage that displays an option to activate a digital wallet with the trusted intermediary system 4, for example by displaying a button including suitable text.

At step 4*e*, the user selects the option to activate the digital wallet and the user system U1 transmits a message indicating the user's selection of this option to the issuing bank system 2.

At step 4*f*, the issuing bank system 2 retrieves credentials associated with one or more transactional accounts held by the user at the issuing bank. For example, the credentials may comprise a unique identifier, for example a PAN associated with one or more current accounts and/or one or more payment cards, such as a debit card or credit card, held by the user at the issuing bank. The credentials may also include one or more verification data elements associated with the unique identifier, exampled of which are provided above. The credentials may also include data, such as an email address or telephone number, which may be used, as described below, to create the digital wallet.

At step 4*g*, the issuing bank system 2 provides the credentials to the trusted intermediary system. The issuing bank system 2 may, in step 4*h*, send data to the user system U1 redirecting the user system to the trusted intermediary system 4. In step 4*i*, the user system U1 requests data from the trusted intermediary system 4, which is provided in step 4*j*.

Figures 7A, 7B:
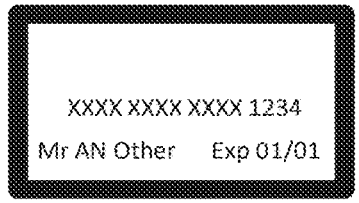
FIGS. 7a and 7b show a representation of content displayed to a user during the process shown in FIG. 6.
Figure 8:
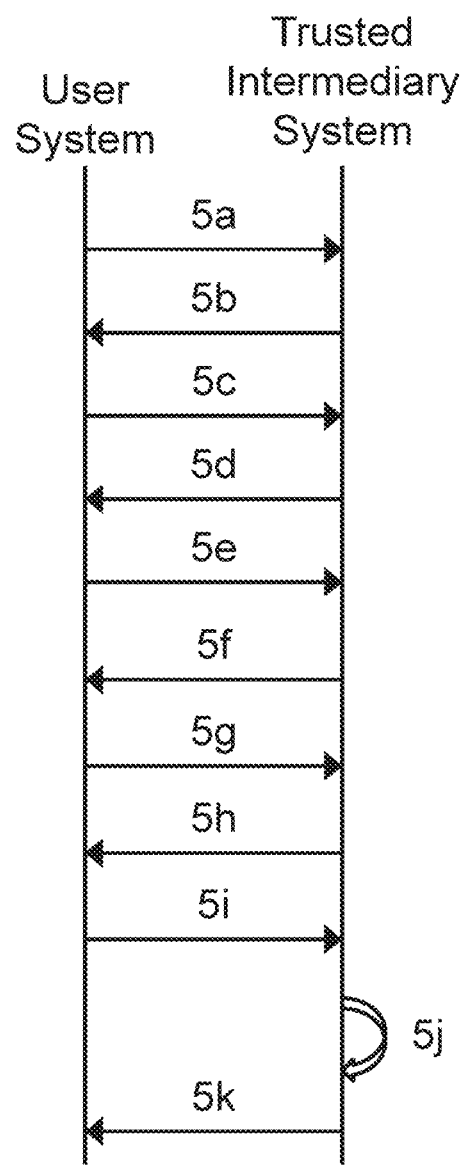
FIG. 8 is a schematic flow diagram showing the flow of data within the payment system for activation of credentials via the trusted intermediary using a first activation mode in accordance with embodiments.

The data provided by the trusted intermediary system 4 in step 4*j* may comprise a page, such as the one shown in FIG. 7*a*, in which the user is requested to select one or more payment instruments issued by the issuing bank. This page may display all, or at least a part, of the unique identifier and the one or more verification data entities retrieved in step 4*f*. For example, for each of the user's cards, a PAN, name and expiry date may be shown. The user may select one or more of these cards for activation.

In addition, one or more of the retrieved credentials of the user, for example an email address or telephone number, may be used to provide authentication or contact data for the digital wallet. These credentials may be used to automatically populate the corresponding fields for the wallet activation, as shown for the email address and telephone number displayed in FIG. 7a. In particular, one of the credentials retrieved from the issuing bank system 2, for example an email address, may be used to present a proposed login name or username for the newly created wallet. This provides the advantage that the user is not only released from entering transaction credentials, but has an easy to remember username automatically presented. This username may be an email address, but may equally be a telephone number, or a login username used, by the user, at the issuing banking system 2 for conventional online banking. Any other information may be presented as a username, the selection of which will be determined by the issuing bank or the trusted intermediary. The user may simply confirm the proposed authentication and contact data. However the user may be allowed to edit these details.

At step 4k, the issuing bank system 2 receives the user's response to the request of step 4j. This response may indicate which payment instruments are to be used to activate credentials in the digital wallet. The response may also include authentication and contact data, such as username and password, as described above.

At step 4l, the trusted intermediary system 4 creates a digital wallet for the user and activates the credentials received from the issuing bank system 2 at step 4g. The trusted intermediary system 4 therefore associates the digital wallet credential(s) with the user's digital wallet.

At step 4m, the trusted intermediary system 4 transmits an appropriate confirmation message to the user system U1 for display to the user to confirm that their digital wallet has been successfully activated at the trusted intermediary system 4. An exemplary confirmation page is shown in FIG. 7b. After this, the user may return to the online banking webpages.

The intermediary system 4 may generate and send an e-mail to an e-mail address associated with the user to confirm successful activation and/or notify the user via an SMS to registered mobile phone and/or send an alert to the user's mobile banking, wallet or payment application on their mobile phone, for example using push notifications.

As such, the user's digital wallet is pre-populated at activation with payment credentials from the user's issuing bank. This reduces the risk of the user erroneously entering incorrect credentials compared to manual entry by the user. This also reduces the amount of user interaction for adding the credentials to the digital wallet since it is added automatically by the issuing bank system 2, rather than being entered manually by the user. The wallet may also be created using retrieved credentials, such as the email address and telephone number described above. This further facilitates the creation of the wallet and reduces the potential for error.

One advantage of using contact details, such as an email address or telephone number from the issuing bank, is that these details may be taken to be verified. Here verification of contact details indicates that the contact details are known to be associated with the user. A typical method of verifying contact details is to send a message, such as an email or SMS, which contains a code. If the message is received by the user, the user will be able enter the code. Since the user will only receive the code if the contact details are correct, the user being able to enter the code indicates that the contact details are correct, and are therefore verified.

If the user manually enters any contact detail element, such as telephone number or email address, the trusted intermediary system may verify these details. However, if the contact details are provided by the issuing bank, then the details may be assumed to be verified, and therefore any verification steps are not required. This demonstrates an advantage of using contact details provided by the issuing bank, as verification steps can be avoided.

In some embodiments, the issuing bank system 2 records the successful activation of the digital wallet for the user such that it need not display an option to activate a digital wallet with the trusted intermediary system 4 each time the user logs into their online banking service.

In some embodiments, the issuing bank system 2 transmits credentials associated with one or more transactional accounts held by the user to the trusted intermediary system 4 prior to the user selecting an option to create their digital wallet and activate a set of credentials. The trusted intermediary system 4 may then store the credentials in the database DB1 and retrieve the credentials associated with the user if and when the user creates their digital wallet and/or activates the credentials. As such, the activation request of step 4i would comprise authentication-indicative data, and may include the additional data, but may not the credentials itself. In some such embodiments, the issuing bank system 2 transmits a batch of credentials for multiple different users prior to those users activating a digital wallet with the trusted intermediary system 4.

Creation of Digital Wallet and Activation of Credentials Via the Trusted Intermediary System 4

In the embodiments depicted in FIGS. 8 to 11 a user creates their digital wallet with the trusted intermediary system 4 directly via a digital wallet creation webpage associated with the trusted intermediary system 4, in so doing the user activates a set of credentials within the wallet. In these embodiments, the user activates the digital wallet outside any transaction.

As mentioned above, embodiments envisage a first activation mode and a second activation mode. Accordingly, the creation of the digital wallet and activation of the associated credentials, via the trusted intermediary system, in the first activation mode will be described with reference to FIGS. 8 and 9.

At step 5a, the user enters the URL of the trusted intermediary login webpage associated with the trusted intermediary 4 into their browser, or otherwise accesses the trusted intermediary login webpage. Alternatively, the user may use specific application software, such as a smartphone application, to access their trusted intermediary system 4.

Figure 9A:
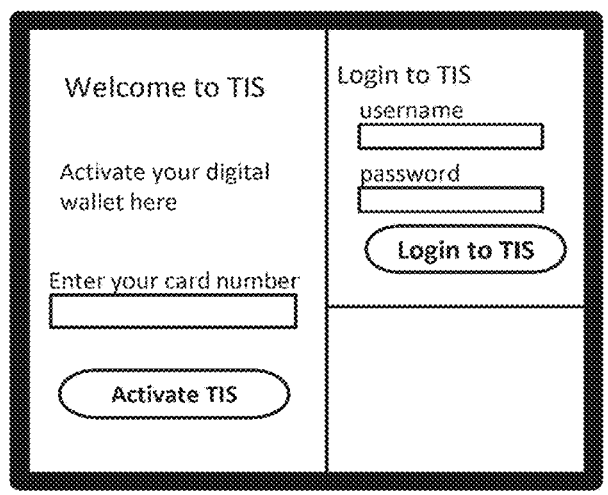

At step 5b, the user system U1 retrieves the trusted intermediary login webpage, shown in FIG. 9a. This webpage offers the user the ability to setup a digital wallet and, in addition, may offer the user the opportunity to login, should a digital wallet already be created.

In step 5c the user selects to setup the digital wallet. In so doing the user may provide, by way of user input, a card number or PAN. In this example, the issuing bank who issued the financial instrument associated with the card number is not able to provide credentials associated with the financial instrument to the trusted intermediary. Therefore, the first activation mode, where user input is requested for the input of the credentials is used.

Figure 9B:
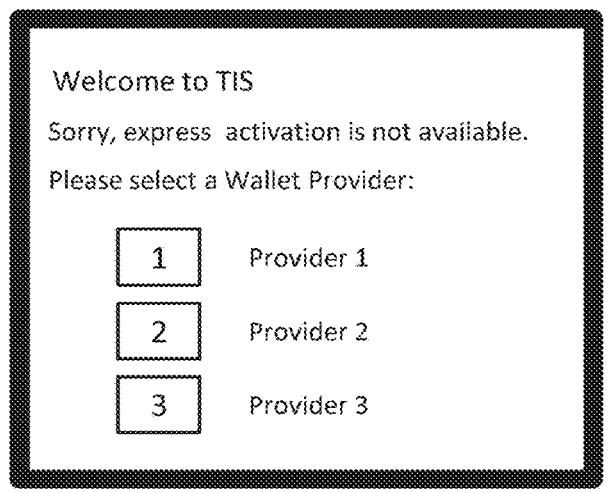

Therefore, in step 5d, the trusted intermediary sends a further webpage to the user. This page is shown in FIG. 9b and prompts the user to select a desired wallet provider. This wallet provider may be the issuing bank of the card the user wishes to add to the wallet, however this is not a requirement, and any party may be a wallet provider.

Figure 9C:
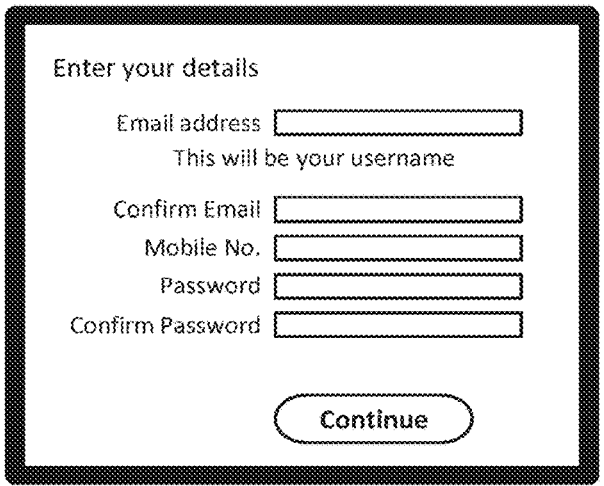

In step 5e the user selects a wallet provider, and consequently, in step 5f, receives the next page, shown in FIG. 9c, which requests the user input a username and password, as well as contact details for the wallet such as an email address and telephone number. These details will be used to create the digital wallet, and enable the user to later login to the wallet. These details may be verified, by sending a verification code to the address indicated by the details. Upon receipt of the code, the user may provide it to the trusted intermediary as user input and thereby verify the address. This is not shown, however, a page requesting the entry of the verification code may be displayed following the display of the page shown in FIG. 9c.

The user provides the requested details in step 5g, which causes the trusted intermediary to provide a fourth page in step 5h, shown in FIG. 9d, in which the user is requested to input details of the card to be stored in the wallet. These details include a unique identifier, such as the card number or PAN, and a number of verification data elements, such as a cardholder name, expiry date, security number and billing address. While not shown, the card number field may be automatically populated using the card number previously entered.

In step 5i, the user system provides the details entered into the page shown in FIG. 9d. Using the user inputted set of credentials, the trusted intermediary, in step 5j, may then activate the set of credentials, making them available to be used in subsequent transactions. As a part of the activation step 5j, the user may be required to authenticate with the issuing bank. Accordingly, the user system U1 may be redirected to an authentication page at the issuing bank system 2, and may enter authentication details associated with the entered card details. This authentication process will be described in more detail in FIG. 11. Following activation, in step 5k, the trusted intermediary may send a confirmation message to the user, such as shown in FIG. 9e.

It will be apparent that in the case that a digital wallet has already been set up, but where a card needs to be added, the above method may, after user login and receipt of input from the user requesting to add a card to the wallet, proceed from step 5g and display the screen shown in FIG. 9d directly.

Figure 10:
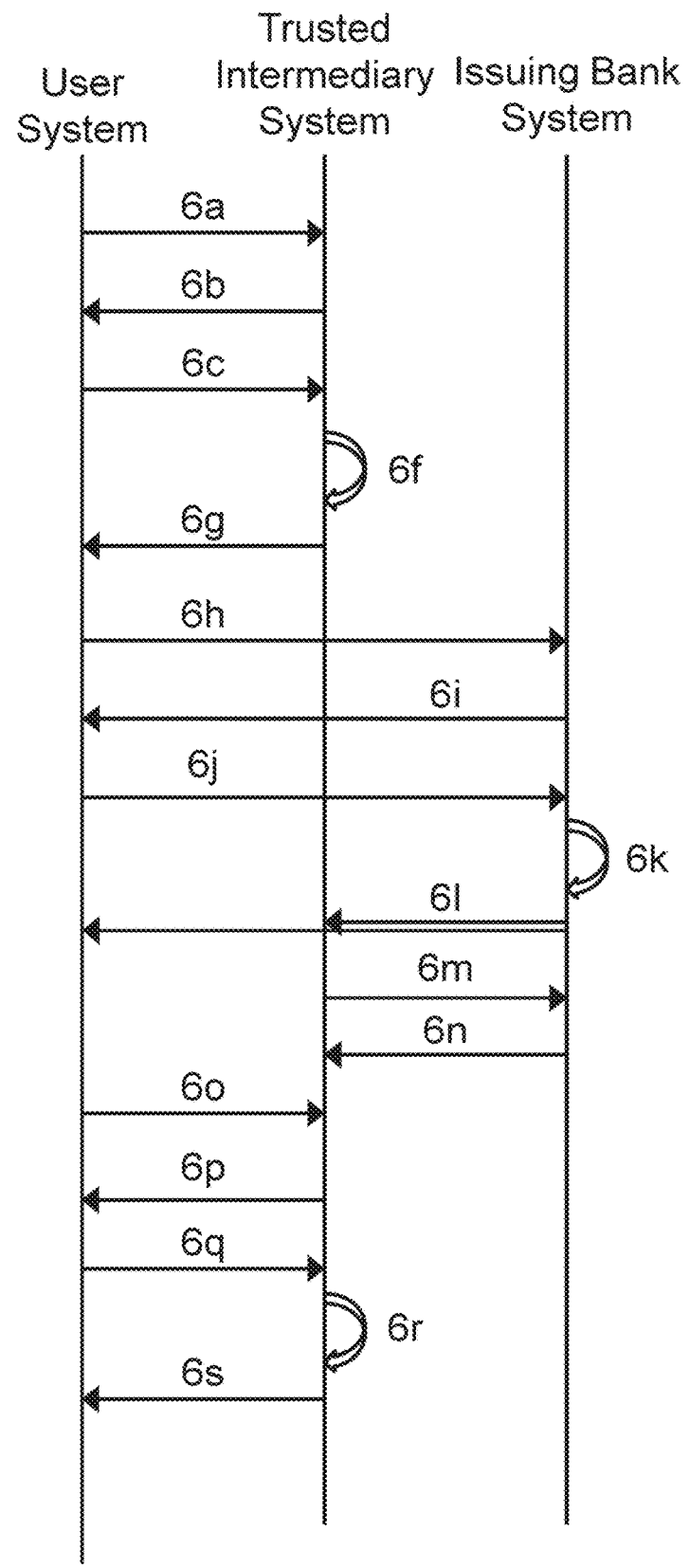
FIG. 10 is a schematic flow diagram showing the flow of data within the payment system for activation of credentials via the trusted intermediary using a second activation mode in accordance with embodiments.

In the alternative, creation of the wallet and activation of the credentials using a second activation mode will now be described with reference to FIGS. 10 and 11.

At step 6a, the user system U1 requests the digital wallet login or activation webpage, for example as a result of the user entering the URL of the digital wallet home webpage or otherwise.

Figure 11A:
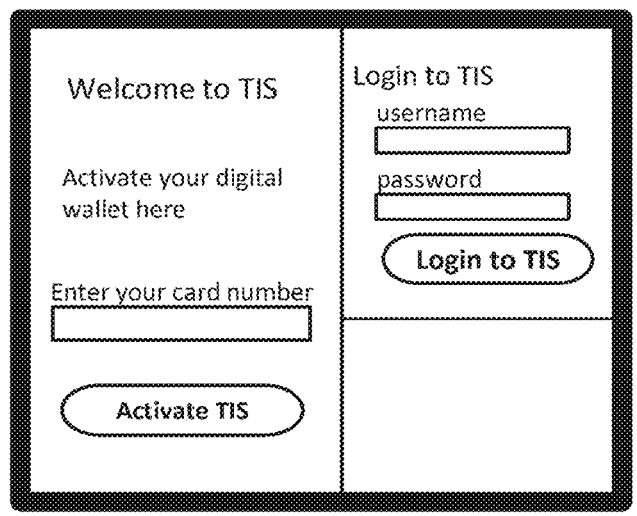
FIGS. 11a, 11b, 11c and 11d show representations of content displayed to a user during the process shown in FIG. 10.

At step 6b, the user system U1 receives the digital wallet activation webpage from the trusted intermediary. The digital wallet activation webpage, such as is shown in FIG. 11a, provides the user with an option to activate a digital wallet with the trusted intermediary system 4 and may also provide the user with the option to log into their digital wallet service if they already have a digital wallet to manage their account. The activation webpage shown in FIG. 11a allows the user to enter a unique identifier, i.e. a card number or PAN directly as a first step in setting up the digital wallet.

At step 6c, the user enters an appropriate card number and selects the option to activate a digital wallet. This user input is then received by the trusted intermediary system 4.

At step 6f, the trusted intermediary uses the card number provided as user input in step 6c (i.e. the unique identifier) to identify the issuing bank system associated with the card number. This issuing bank system will be the bank system of the bank which issued the card to the user. This step may be performed using a lookup table of card numbers and the associated issuing bank.

At step 6g the trusted intermediary system 4 instigates an authentication process between the user system U1 and the issuing bank system. There are a number of ways this may be done. For example the trusted intermediary system 4 may, in step 6g, provide the user system with a link or URL to authentication webpage at the issuing bank. This link may cause a webpage, provided by the issuing bank system to be loaded within an iFrame within a webpage provided by the trusted intermediary.

Figure 11B:
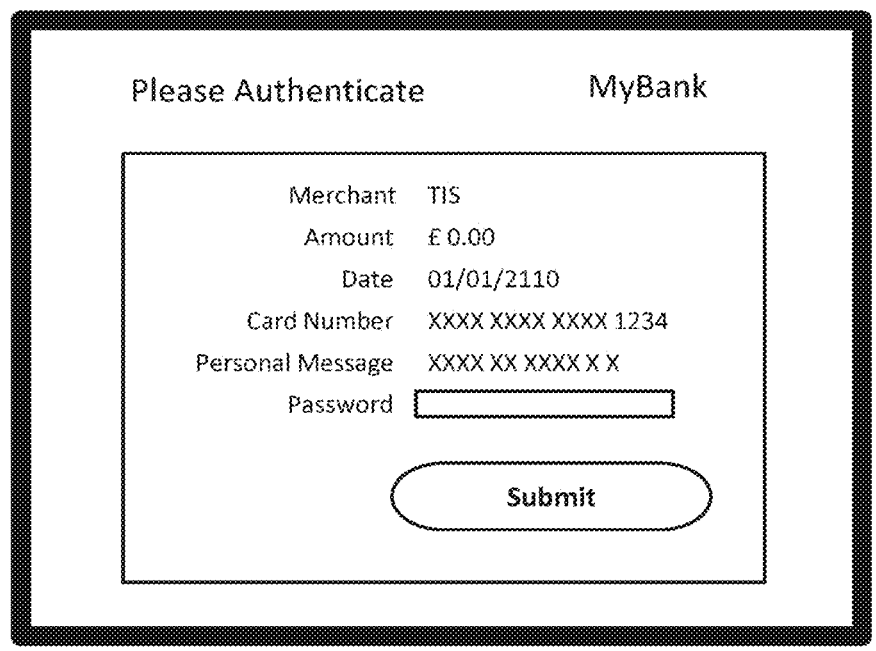

Consequently in step 6h the user equipment contacts the issuing bank and in step 6i is provided with an authentication page such as shown in FIG. 11b. It will be realized that, so far, the user has only been required to enter a card number and click a single button. The other steps were all performed autonomously by the system.

The issuing bank may be provided with information indicating that the authentication is for the purposes of activating credentials. In this example the issuing bank has received an authenticating request in which an indicated merchant name is "TIS" (for trusted intermediary system), and in which the transaction amount has been set to zero. Both these fields are shown in FIG. 11b.

In step 6j the user inputs an appropriate authentication credential into the authentication webpage. This credential is then sent to the issuing bank. Subsequently, in step 6k, the issuing bank authenticates the user using the input authentication credential. Assuming the user to be authenticated, the issuing bank makes a response indicating that the user has been authenticated.

This response may be sent to the user system and to the trusted intermediary in step 6l. Responsive to the indication that the user is authenticated, the trusted intermediary may then request, in step 6m, credentials associated with the card number from the issuing bank. These credentials may be the same, or similar, to the credentials entered manually by the user into the webpage shown in FIG. 9d. The credentials are delivered to the trusted intermediary in step 6n.

In addition, upon receipt of the response in step 6l, the user system U1 may redirect to the trusted intermediary system 4. Therefore in step 6o, the user system may request a further page from the trusted intermediary system 4.

At the page request the user enter or confirm contact details such as an email address and/or a telephone number. As described above the username, which may be an email address or telephone number, may be created using the credentials received from the issuing bank. Therefore the page may be pre-populated with email address and mobile telephone number received from the issuing bank.

Figure 11C:
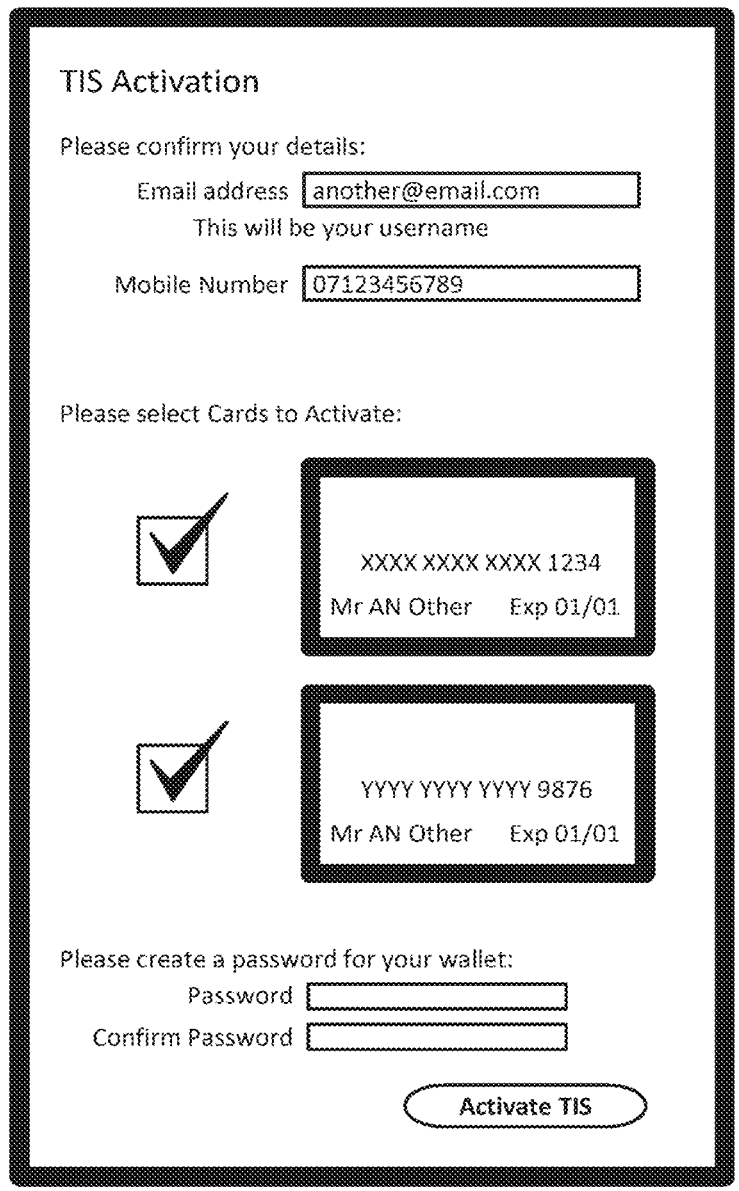
Figure 11D:
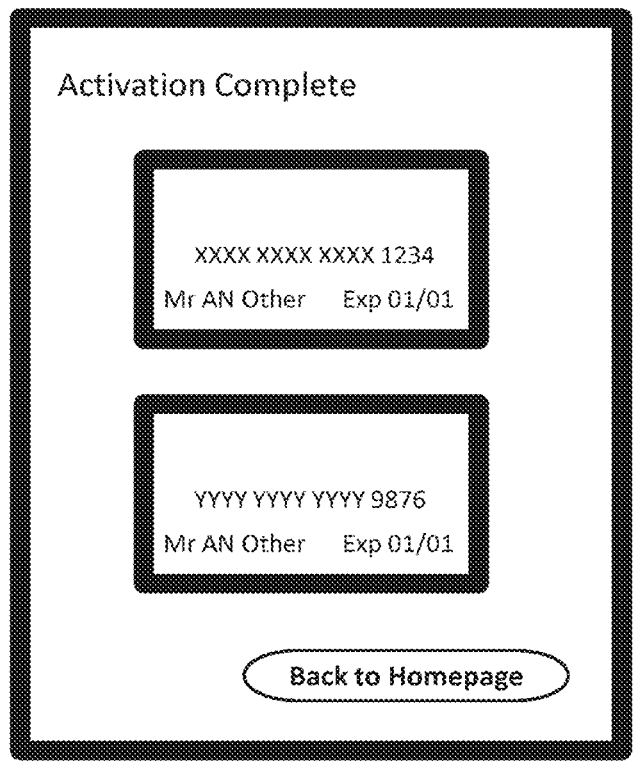

The page may also display one or more of the credentials received from the issuing bank to confirm that the details have been correctly retrieved. Where the issuing bank holds more than one financial instrument for the user, all the financial instruments may be displayed for the user to pick one or more. Details of these cards are shown, including card number as well as verification data elements, in this case the cardholder name and expiry date are shown in FIG. 11c. As is apparent, this system enables authentication using a first unique identifier, i.e. card number, to be used to retrieve more than one card number and more than one set of verification data elements. Each may be activated, based on the earlier authentication of the user, therefore the user, through a single unique identifier (card number) is able to populate a wallet with details of multiple cards or other financial instruments.

The page provides user input to the trusted intermediary system. This user input may confirm the details sent in step 6o, may select one or more of the offered financial instruments, and may provide a password. In response, in step 6r the trusted intermediary creates the digital wallet, and activates the credentials provided by the issuing bank. A confirmation message, such as the page shown in FIG. 11d may be provided to the user system U1. As can be seen, the user has activated two cards, therefore both these cards are shown as being activated.

Therefore, it can be seen that by requesting a unique identifier from the user, and then instigating an authentication process between the user and the issuing bank, the creation of the digital wallet, and the activation of credentials is substantially simplified in the second activation mode in comparison to the first activation mode.

It will be apparent that in some cases, the trusted intermediary system 4 may determine that the card number input in step 6c was issued by a bank which is unable to provide the credentials as described in step 6n. Therefore, in such cases the intermediary system may use the first activation mode described above in FIG. 8, and in particular move to step 5c of this Figure.

Digital Wallet Activation Via a Merchant Online Processing System

Figure 12:
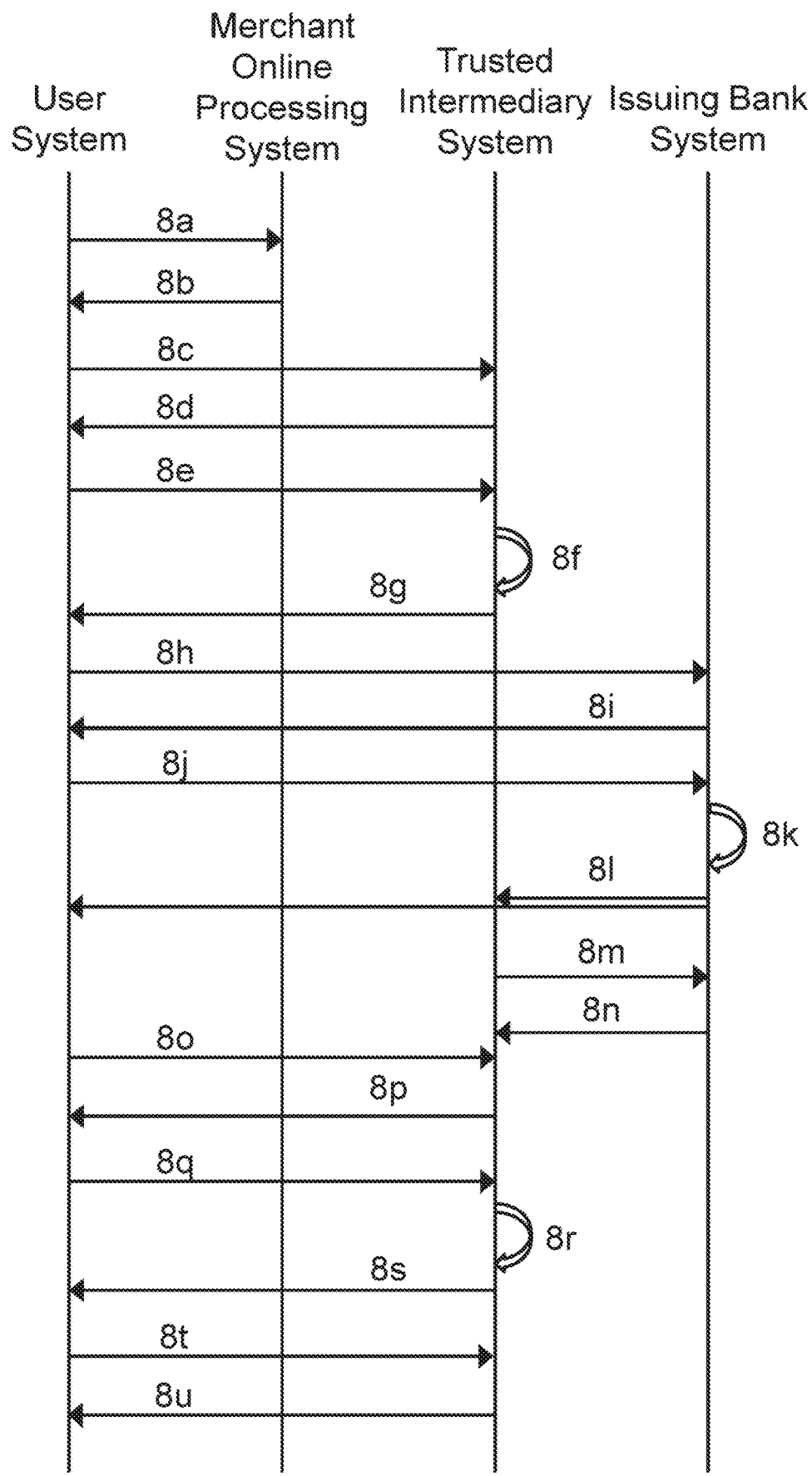
FIG. 12 is a schematic flow diagram showing the flow of data within the payment system for activation of credentials via a merchant using a second activation mode in accordance with embodiments.

In embodiments depicted in FIGS. 12 and 13, a user creates their digital wallet and activates credentials during transaction processing via the merchant online processing system 1. Activation can thereby be embedded seamlessly into the user's checkout experience and uses authentication through online banking for activation. In these embodiments, the user creates the digital wallet in-transaction. For simplicity, only the second activation mode, in which credentials are received from the issuing bank, will be described. Nevertheless, in cases where the second activation mode is not possible, such as where the issuing bank is unable to provide the verification data, it will be apparent that the first activation mode may be used in this context.

Figure 13A:
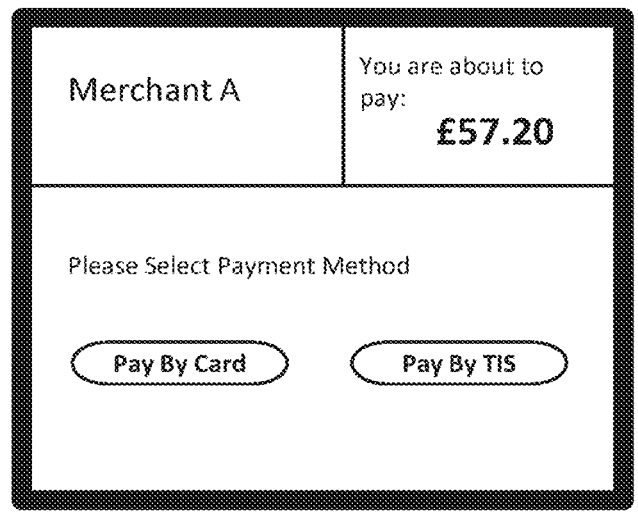

Prior to step 8a, the user has initiated a transaction via the online merchant, has selected one or more products and/or services for purchase, and has initiated a purchase completion process. The user is prompted to select a payment option for their purchase. The payment options include paying using a digital wallet, such as is depicted in FIG. 13a.

At step 8a, the user selects the option to pay using a digital wallet, and the user system U1 transmits a corresponding message to the merchant online processing system 1.

Figure 13B:
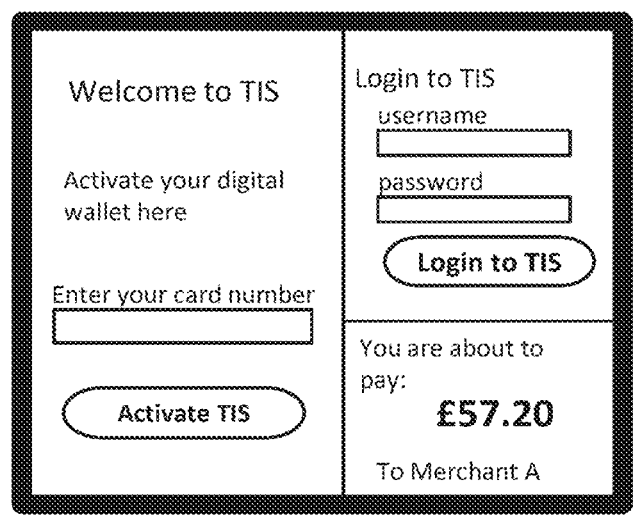

At steps 8b, 8c and 8d, the merchant online processing system 1 transmits a message to the user system U1 to trigger the browser to reload its payment page within an iFrame, the content of which is provided by the trusted intermediary system 4 and which corresponds to the content of a digital wallet payment page. The message sent from the user system U1 may include a return merchant URL, which is passed from the merchant online processing system through the user system U1 to the trusted intermediary system 4 in message 8c, where it is temporarily stored for use later in the process. The iFrame provides the user with an option to activate a digital wallet with the trusted intermediary system 4. The content of the iFrame may be such as is shown in FIG. 13b, and is similar to the page described above with reference to FIGS. 9a and 11a, with the details of the merchant and the amount payable included. The user may be presented with the option to login to the TIS, an alternatively to create a digital wallet. To enable the wallet to be created, the user may be prompted to enter a card number, i.e. a PAN.

At step 8e, after the user has selected the option to create a digital wallet, and has provided the card number as a user input, the user system U1 transmits a message to the trusted intermediary system 4 indicative of the user requesting digital wallet activation, and providing the card number to the trusted intermediary.

Steps 8f to 8r proceed as per steps 6f to 6r, with only minor differences. In these steps, the trusted intermediary identifies the issuing bank and the user authenticates with the issuing bank. Upon successful authentication, the user record is created and the credentials, received from the bank, are activated within the user record.

Figure 13C:
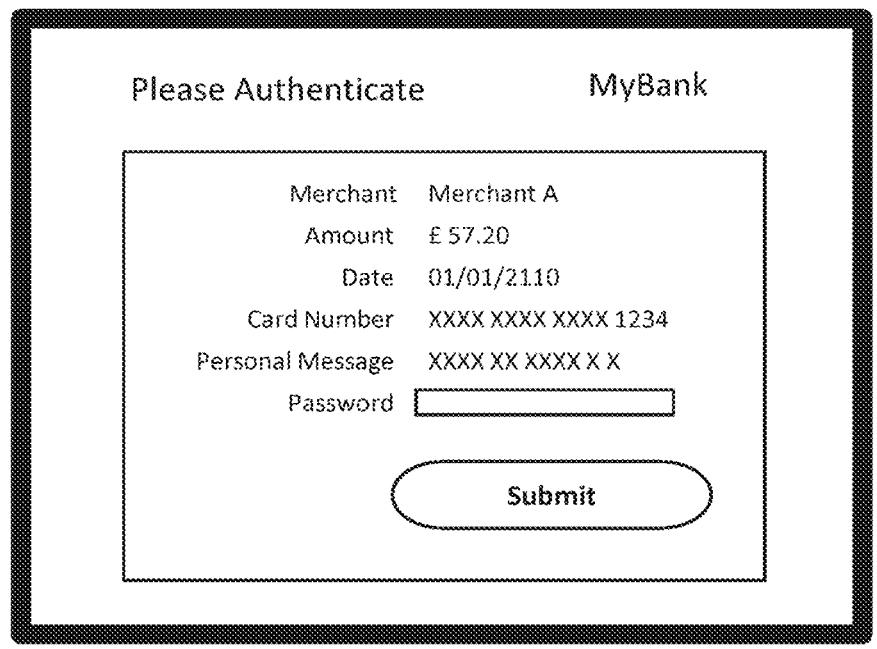
Figure 13D:
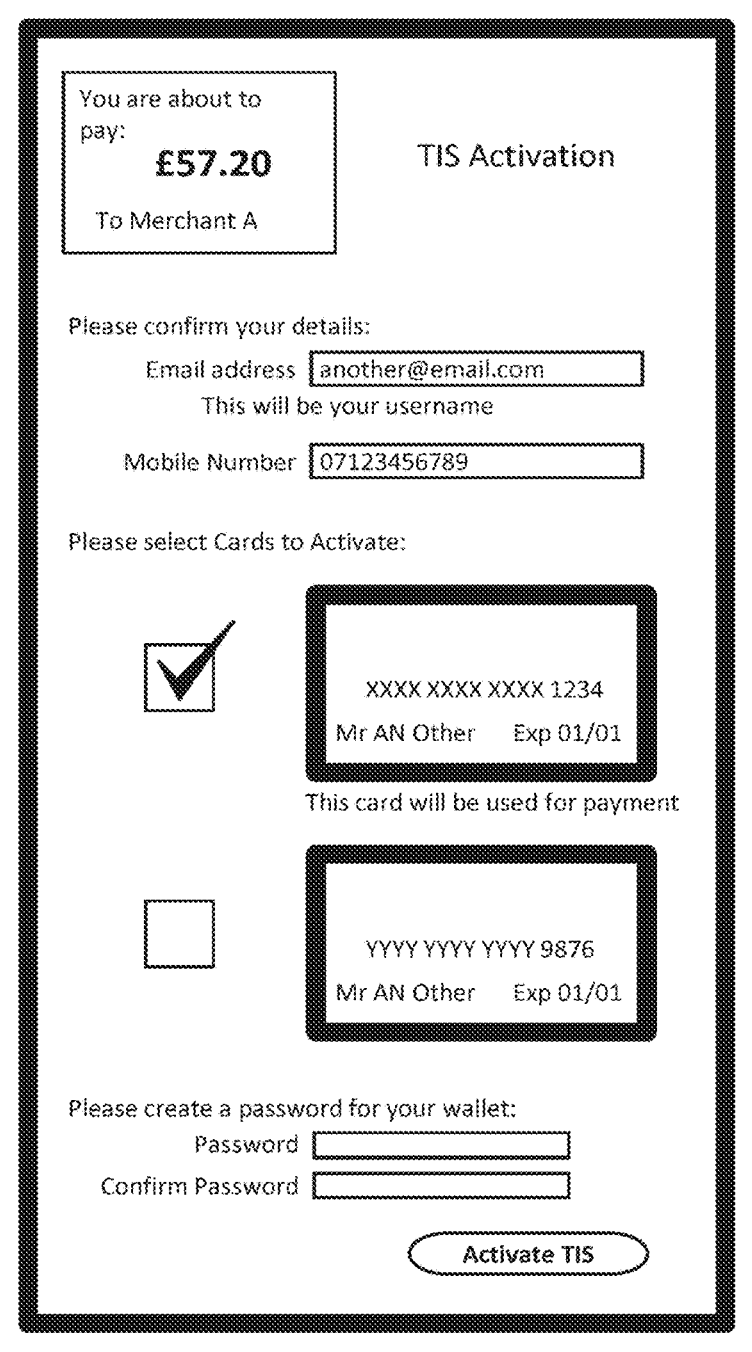

As with the activation mode instigated through the wallet interface, the authentication here in steps 8i and 8j also uses an authentication process performed by the issuing bank. However in this instance, the authentication can additionally be used to authenticate the user in relation to the transaction. This has a first advantage that the user need only authenticate once to both activate the credentials and to authenticate for the transaction. FIG. 13c shows the screen which may be displayed for the authentication. Here the merchant field not only contains the name of the merchant ("Merchant A"), but an indication that the authentication comes via the trusted intermediary. In this embodiment this is indicated by the merchant name ("Merchant A") being preceded by "TSI:" however any indication may be used. The indication indicates to the trusted intermediary that the authentication is associated with a trusted intermediary, as well as with a merchant payment.

Figure 13E:
Figure 13F:
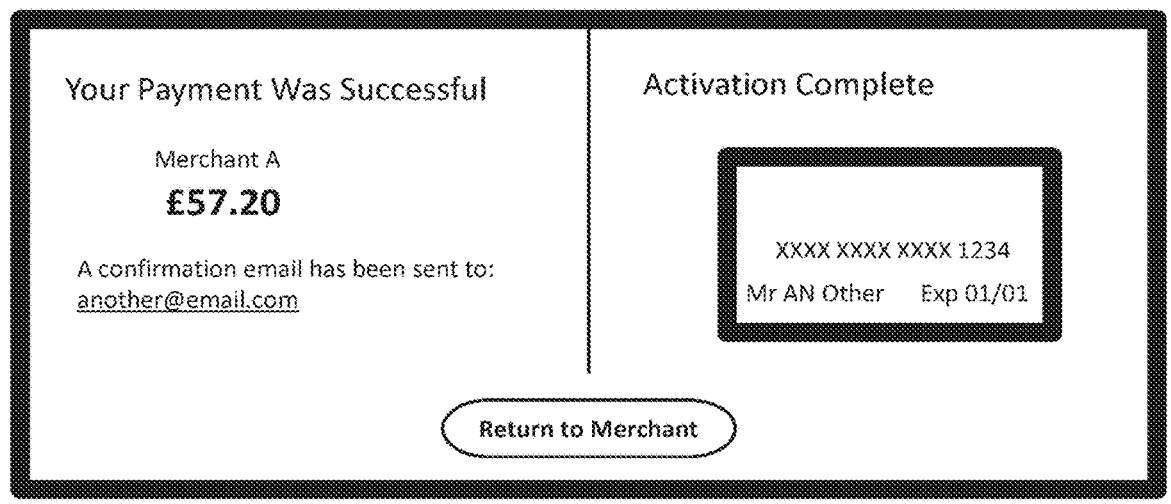

After creation of the digital wallet and activation of the credentials, since a transaction is being conducted along with the activation, in step 8s the trusted intermediary may send to the user system U1 a final confirmation message, requesting final confirmation that the payment is to be made. An example of such a screen is shown in FIG. 13e. The user may then confirm the payment, as shown by step 8t. After which a confirmation may be sent to the user system as shown by FIG. 13f and in step 8u. This confirmation may correspond to the confirmation sent in step 2s above, and may be followed by equivalents of steps 2t to 2w.

Use of the Authentication at the Issuing Bank

The above embodiments have been described as using an authentication process conducted by the issuing bank, which may also be used for a transaction. In such cases, the trusted intermediary system 4 may wish to indicate to the issuing bank that the authentication is for activation of credentials, and not only a transaction. This may be done by, for example, including in the merchant name, the string "TIS", as described above. However any suitable indication may be used.

This may be advantageous in cases where the transaction is, for example, of a low value, and in which the issuing bank may otherwise operate in accordance with e.g. a rule specifying that authentication is not required for the transaction. In such a scenario the user would not be required to authenticate, and the bank may give approval without any user input. This would be undesirable where the authentication is to be used to activate a digital wallet. Therefore, by providing an indication that the authentication comes via the trusted intermediary, the issuing bank will be able to determine that the transaction needs to be authenticated, thereby overriding conventional security rules (based on e.g. transaction value).

Moreover, by providing such an indication to the issuing bank, the issuing bank may know, if desired, to use a higher level of authentication, i.e. one which would otherwise not be requested for a transaction. Since the authentication is provided by the issuing bank, which is to say that is the authentication is between the issuing bank and the user, the issuing bank may select any authentication mechanism. For example, the issuing bank may require more credentials to be provided by the user, or may require the user to use a onetime passcode to authenticate. Some examples of suitable authentication processes include: device-based authentication—data derived from a device the user has possession of (e.g., ID card, security token, software token, phone, or cell phone) and/or data gathered through communication with the user system U1, such as automatic detection of device type, connection or other software or hardware characteristics, or other data derived from communication with the user system U1, e.g. geo-location data derived from the IP address of the user system U1); biometric authentication—biometric data derived from the user (e.g., fingerprint or retinal pattern, signature or voice recognition, unique bio-electric signals, or another biometric identifier); and other authentication factors—such as a one-time password (OTP) entered by the user.

Activation of Multiple Financial Instruments

In the above description, multiple financial instruments, i.e. payment cards, could be activated when the user had multiple cards at a given issuing bank. See FIGS. 7a, 11c and 13d for the user being offered the opportunity to select multiple cards for activation. It will be understood that this is possible despite the user only authenticating once. In the case of FIG. 7a, with an online banking system, however in the case of FIGS. 11c and 13d this authentication was performed using a unique identifier associated with one of the plurality of available financial instruments.

This activation of multiple financial instruments may be extended to situations where financial instruments are issued by different institutions (i.e. different issuing banks). In such situations, a directory server or the like may contact a plurality of financial institutions, and retrieve credentials which may be activated for the digital wallet.

In one embodiment, the directory server may take the place of the issuing bank described above. As such, the user may authenticate with the directory server, and the credentials may be retrieved from, or via, the directory server, despite originating with different issuing banks. The directory server may therefore be connected to a plurality of issuing banks so as to be able to retrieve the credentials. The authentication may still be performed using a unique identifier, such as a card number, from one of the sets of credentials.

In the alternative, the user might authenticate using with one issuing bank. Following that, the issuing bank may indicate to the directory server that the user is authenticated, at which point the directory server retrieves the details of multiple sets of credentials for activation.

In either case, the functionality of the directory server may be incorporated into a separate entity, an issuing bank, and/or the trusted intermediary.

Alternative Method for Selecting Activation Mode

In some embodiments, the selection of the activation mode may be made via the user providing appropriate input prior to entering the card number. For example the user may identify issuing bank associated with their card number, without providing the card number itself. This may subsequently be used to determine the whether the issuing bank supports the provision of user data, and therefore to select an activation mode to use. As such, steps 5b and 5c may be omitted from the method described in FIG. 8 and after the receipt of the user input in step 5c, the trusted intermediary system may then determine whether to use the first activation mode or the second activation mode, depending on whether the identified bank is able to provide credentials. The trusted intermediary may proceed to step 5d for the first activation mode and to step 6c for the second activation mode.

Alternative Systems to Use in Place of Issuing Bank

The above system has been described with an issuing bank providing user data, such as the verification data elements, to the trusted intermediary system. However, an issuing bank may not be the only system which does this. For example, a telecommunications company may store payment data for a user, and may even provide a payment system in which a telephone number is used in place of a card number to authorize payments. As such, a telecommunications service provider data processing system may provide the verification data elements to the trusted intermediary. The unique identifier may, in such cases, be a telephone number.

In further embodiments, the provider of the verification data elements may be a merchant. This may be applicable where the merchant stores details of multiple payment instruments. Accordingly, the stored details may be provided by the merchant to the trusted intermediary. In such cases, the merchant may be provided by the same operator as the trusted intermediary. Therefore, the merchant, upon activation of a set of credentials, may retrieve verification data elements from the merchant's payments system, and may make these details available in a digital wallet for use with other merchants.

Selection of Username

In the description above, a username, such as an email address or telephone number, is generated for the digital wallet by the trusted intermediary system. This process may be adapted for various situations.

For example, in embodiments, the user may be presented with a plurality of usernames. These may include one, or a plurality of email addresses (should the user have multiple email addresses stored in the issuing bank system) and likewise one, or a plurality of telephone numbers. Other usernames, or contact details may be used. Presented with this plurality of potential usernames, the user may be given the opportunity to select one to be used as a username. In the alternative, the user may be allowed to use a plurality, or even all, of the usernames.

In embodiments, the trusted intermediary may check each potential username to determine if it is unique. This may not be the case where the username is already associated with a digital wallet—a user may have multiple digital wallets—or where the username is created from e.g. a first name and surname of the user. In such embodiments, the trusted intermediary may present only those usernames which are not already associated with existing wallets. Alternatively or additionally, the trusted intermediary may modify the generated usernames until a unique username is generated. For example, where the username is generated form a user's name, the trusted intermediary may determine that "johnsmith" is taken, and therefore suggest johnsmith29 or similar. Irrespective, the username(s) will have been generated, at least in part, using the received user data.

Modification of Unique Identifiers

In some embodiments, the card numbers and/or the username for the user may change. To overcome this, the trusted intermediary may store, within a user record, a user record unique identifier which will not be changed and will uniquely identify the user. Therefore the username may be changed, however the account may still be uniquely identified within the trusted intermediary system.

The trusted intermediary system may further store in a user record one or more account unique identifiers, which are associated, at the issuing banks, with accounts. Therefore, even if a card number were to change, the account, linked to the user record by the account unique identifier would still be identifiable by the trusted intermediary system. In this latter case, the trusted intermediary may communicate with the issuing bank to ensure that the card number and/or the verification data elements such as address and security code are correct and up to date.

Alternate Forms for Unique Identifier

While the above description uses a card number (i.e. PAN) or a telephone number as the unique identifier, other unique identifiers may be used. These include (but are not limited to):

an identifier used for a national ID scheme, for example DNI-e in Spain;

an identifier used in a national authentication scheme, for example BankID in the Nordics (which leverages national ID number);

a driving license identifier;

an International Bank Account Number (IBAN) or other bank account information;

online banking credentials, e.g. a customer ID number;

a passport number;

a social security or national insurance number;

an identifier used for government services, for example state benefits or taxes;

a utility account number, such as used for gas, electricity, pay TV or internet access (i.e. ISP account number);

a mobile telephone International Mobile Station Equipment Identity (IMEI);

social media credentials, such as a login name or screen name;

a common token for example an identifier associated with a cross-domain cookie;

a wallet provider embedded identifier, such as an identifier previously provided by a bank or an operator of the intermediary system which may be a code or a unique URL.

Configuration of the Trusted Intermediary System 4

Figure 14:
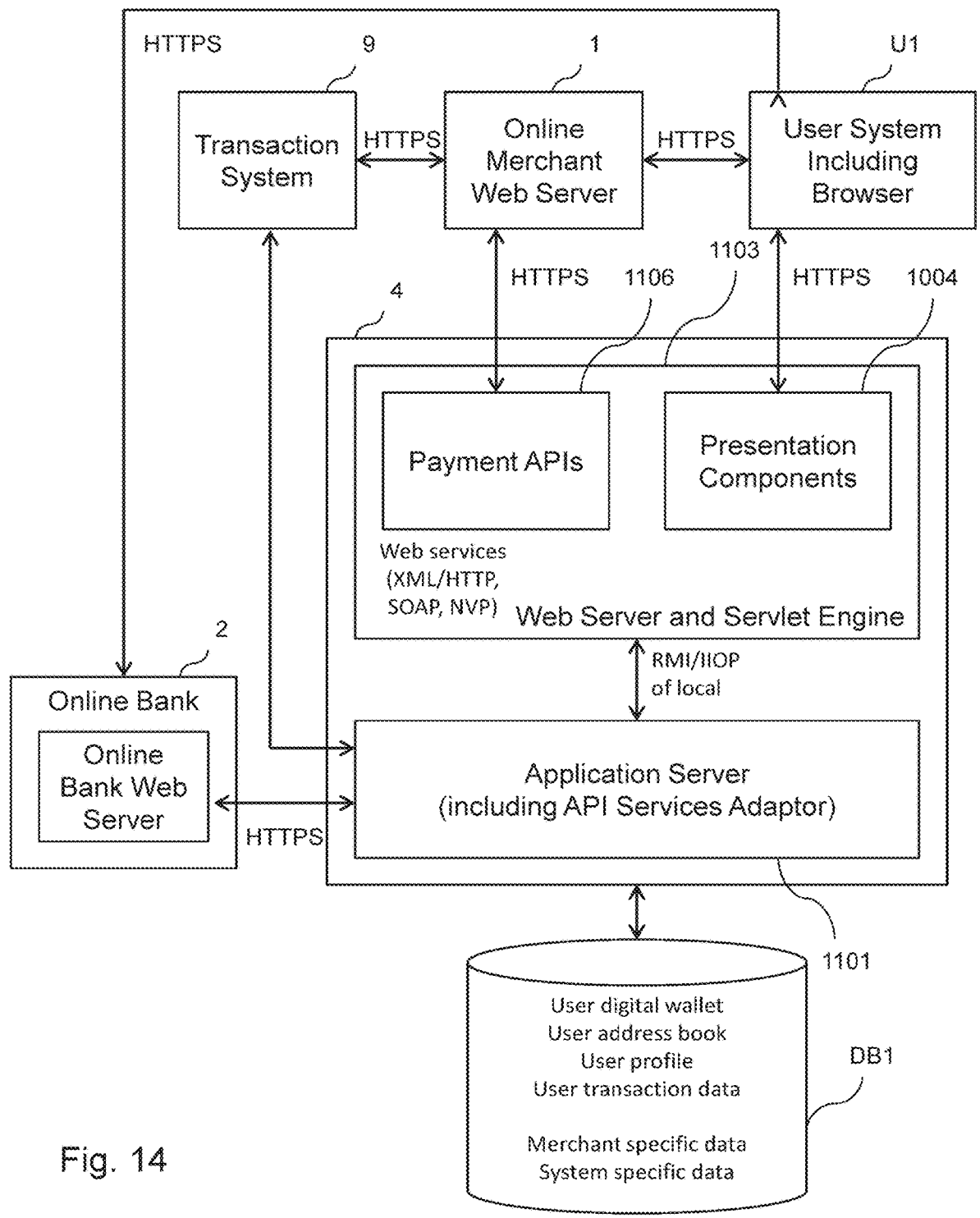
FIG. 14 is a schematic block diagram showing components of the trusted intermediary system in accordance with embodiments.

Details of the configuration and processing capabilities of the trusted intermediary system 4 will now be described with reference to FIG. 14.

The trusted intermediary system 4 may be embodied as a web application server, for example as an application server 1101 which manages and provides access to the common business logic of the trusted intermediary system 4, and a web server and servlet engine 1103, which acts as the entry point for external HTTP requests to the trusted intermediary system 4 from merchants and from users' browsers.

The web server and servlet engine 1103 comprises presentation components 1104 which expose secure web services-based payment APIs or API wrappers 1106 to merchant systems and which are configured to generate and manage the interface to the user system U1, for example when the user wishes to register or selects a payment method in the manner described above.

The trusted intermediary system 4 comprises various other processing components, which are configured to transmit and manage various bank-, user- and merchant-specific data, and will now be described.

Digital Wallet Activation Components and Data

When the user wishes to make use of the digital wallet facility offered by the trusted intermediary system 4, they complete a digital wallet activation process. Activation of the digital wallet held by the trusted intermediary system 4 can be performed via any suitable interface. When the trusted intermediary system 4 is implemented as a web server, activation may be via a web browser. Once registered, each user has an associated user record, which may store demographic identification and/or authentication data for the user as well as activated sets of credentials. This data may be modified via presentation components 1104, while user transaction data and retrieved payment credentials can be displayed for review by the user. In addition, the user may have address book entries, which hold shipping details. These shipping details may be received as one or more of the verification elements, however they may also be manually entered by the user via the presentation components 1104. Where the trusted intermediary system 4 is implemented as a web server, the presentation components 1104 interoperate with the user's browser to allow selection and modification of the credentials and possibly other user data as described above. The presentation components 1104 may also enable the user to select and add to/remove from/edit a list of payment instruments stored in the user's digital wallet.

User Authentication Components

Authentication of a user for using their digital wallet may be performed directly with the trusted intermediary system 4 using, for example, 1-factor authentication—data the user knows (e.g., a username and password, pass phrase, or personal identification number (PIN)). More advanced, i.e. two or three factor authentication may be used.

Bank Data Store

The trusted intermediary system 4 stores bank identifying information for those issuing banks that have signed up to the digital wallet service. For each listed issuing bank, the database DB1 holds data identifying a URL corresponding to their online banking login page. The bank identifying information may contain data on the range or card numbers associated with the bank. For example, the first six digits of a typical card number form an issuer identification number. Therefore the bank identifying data may contain data linking the issuing banks the issuer identification numbers used by the bank.

Application Programming Interfaces (API) Services Adaptor

The trusted intermediary system 4 comprises an API services adaptor, which enables connectivity between the trusted intermediary system 4 and the messaging infrastructure of the overall system 10. The adaptor is configured to manage the fulfilment of the trusted intermediary system 4 requests to external services, such as payment authorizations to the transaction system 9 and to expose a set of trusted intermediary system 4 services that could be used by external functions such as the transaction system 9.

Transaction-Specific Components and Data

The trusted intermediary system 4 may store transactional data such as payment authorizations and settlements that are managed by the trusted intermediary system 4. In addition, the trusted intermediary system 4 can store audit data associated with merchant online activity as well as general system activity.

Messaging Services

The trusted intermediary system 4 may be configured with email agents, which compose and transmit emails for the purposes of email address authentication and user activation and purchase order confirmations. The trusted intermediary system 4 may also be configured with an SMS gateway or other PUSH service interfaces for notifications (for example to an Apple Push Notification Services (APNS) server).

Embodiments described above enables the user to select a payment method on a per transaction basis, whilst removing the requirement for the user to provide payment details to individual merchants. Thus, provided merchants subscribe to the trusted intermediary system 4, users only need allow retrieval of, or submit, their respective payment details once, to a single entity. This has the benefit of reducing the risk of fraud that may be incurred in relation to conventional payment systems that require the user to enter their card payment details via the merchant's system.

The above embodiments are to be understood as illustrative examples of the invention. Further embodiments are envisaged.

In embodiments described above, the authentication mechanisms used for payment transactions involving merchants, it is envisaged that issuing bank-based authentication mechanisms may be used when a user wishes to use their digital wallet, provided by the trusted intermediary system, to initiate a person-to-person payment, and may also be used when the user wishes to change certain predetermined profile contact details relating to the user record at the trusted intermediary system, including for example the registered email address and/or the registered mobile phone number used for step-up authentication.

In the embodiments described above, the registration requirements and authentication strength or process can be altered depending on information available to the trusted intermediary system 4 about the user, the user's device, the browser used by the user and the connection used by the user (e.g. the user's IP address) to ensure that risk of fraudulent activity is reduced. Thus, in addition to the above processes, supplemental additional risk assessment based on automatically collated data about device, user, connection or browser can be employed by the trusted intermediary system 4 to make a decision on increasing or decreasing the registration data requirements or the strength of authentication.

While the above has been described in terms of an entity, such as an intermediary system, performing certain steps, it will be appreciated that embodiments may be practiced by any suitably configured apparatus of system. In particular, in some embodiments there may be provided apparatus comprising at least one processor and at least one memory including computer program instructions, where the at least one memory and the computer program instructions are configured to, with the at least one processor, cause the apparatus at least to perform one or more of steps described above. In other embodiments, there may be provided a computer program product comprising a non-transitory computer-readable storage medium having computer readable instructions stored thereon, the computer readable instructions being executable by a computerized device to cause the computerized device to perform one or more of the steps above.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. A method of activating a digital wallet and processing a payment transaction using the digital wallet, the method of activating of the digital wallet and processing of the payment transaction comprising:
   receiving, by a second system from a user terminal operated by a user, a first unique identifier, wherein the first unique identifier is a primary account number and the second system comprises a digital wallet data processing system;
   identifying, by the second system, a first system based on the first unique identifier, the first system being different from the user terminal;
   initiating, by the second system, a first authentication process by the first system based on the first unique identifier; and
   responsive to the user successfully authenticating during the first authentication process:
      receiving, by the second system, user data associated with the first unique identifier from the first system;
      presenting, by the second system, a second unique identifier to the user, the second unique identifier being derived from at least a part of the user data associated with the first unique identifier in the first system, the second unique identifier identifying the user to the second system and being different from the first unique identifier; and
      storing, by the second system, the first unique identifier and the second unique identifier,
   the processing of the payment transaction comprising:
      authenticating, by the second system, the user using the stored second unique identifier; and
      conducting, by the second system, the payment transaction using the stored first unique identifier.

2. The method of claim 1, wherein the second unique identifier comprises a username to be associated with a second system password to define credentials for use in the second system.

3. The method of claim 1, wherein the first unique identifier is associated with a first system password to define credentials for the user in the first system.

4. The method of claim 1, wherein the first authentication process is conducted between the user and the first system.

5. The method of claim 1, wherein the first authentication process uses at least the first unique identifier to authenticate the user.

6. The method of claim 1, comprising:
   generating a plurality of second unique identifiers;
   sending the generated plurality of second unique identifiers to the user;
   receiving user input from the user, the user input indicating that a one of the plurality of generated second unique identifiers is to be used; and
   activating the indicated second unique identifier in the second system based upon the user input.

7. The method of claim 1, comprising:
   receiving a plurality of elements of the user data associated with the first unique identifier from the first system; and
   storing at least one or more of the plurality of elements of the user data received from the first system, other than the at least part of the user data upon which at least a part of the second unique identifier is generated.

8. The method of claim 1, wherein the primary account number (PAN) is associated with a financial instrument.

9. The method according to claim 8, wherein the user data comprises payment credentials associated with the financial instrument.

10. The method according to claim 9, wherein the second system initiates the payment transaction using the payment credentials.

11. The method of claim 1, wherein the at least part of the user data associated with the first unique identifier in the first system on which the second unique identifier is based comprises a contact data element.

12. The method according to claim 11, wherein the at least part of the user data associated with the first unique identifier in the first system on which the second unique identifier is based comprises an email address or telephone number.

13. The method of claim 1, further comprising generating the second unique identifier using the at least part of the user data associated with the first unique identifier in the first system.

14. The method of claim 1, wherein the first system comprises an issuing bank data processing system.

15. A digital wallet data processing system comprising at least one memory including computer program code, and at least one processor in data communication with the at least one memory, wherein the computer program code causes the at least one processor to activate a digital wallet and process a payment transaction by performing steps comprising:
  receiving, by a second system from a user terminal operated by a user, a first unique identifier, wherein the first unique identifier is a primary account number and the second system comprises a digital wallet data processing system;
  identifying, by the second system, a first system based on the first unique identifier, the first system being different from the user terminal;
  initiating, by the second system, a first authentication process by the first system based on the first unique identifier; and
  responsive to the user successfully authenticating during the first authentication process:
    receiving, by the second system, user data associated with the first unique identifier from the first system;
    presenting, by the second system, a second unique identifier to the user, the second unique identifier being derived from at least a part of the user data associated with the first unique identifier in the first system, the second unique identifier identifying the user to the second system and being different from the first unique identifier; and
    storing, by the second system, the first unique identifier and the second unique identifier,
  the processor being further configured to process a payment transaction comprising:
    authenticating, by the second system, the user using the stored second unique identifier; and
    conducting, by the second system, the payment transaction using the stored first unique identifier.

16. The digital wallet processing system of claim 15, wherein the second unique identifier comprises a username to be associated with a second system password to define credentials for use in the second system.

17. The digital wallet processing system of claim 16, wherein the first authentication process is conducted between the user and the first system using at least the first unique identifier to authenticate the user.

18. The digital wallet processing system of claim 15, wherein the at least part of the user data associated with the first unique identifier in the first system on which the second unique identifier is based comprises an email address or telephone number.

19. A method of activating a digital wallet and processing a payment transaction using the digital wallet, the method activating of the digital wallet and processing of the payment transaction comprising:
  sending, by a user terminal operated by a user to a second system, a first unique identifier, wherein the first unique identifier is a primary account number and the second system comprises a digital wallet data processing system;
  performing, by the user of the second terminal, a first authentication process using a first system based on the first unique identifier; and
  responsive to the user successfully authenticating during the first authentication process:
    receiving, by the user terminal, a second unique identifier, the second unique identifier being derived from at least a part of the user data associated with the first unique identifier in the first system, the second unique identifier identifying the user to the second system and being different from the first unique identifier; and
    presenting, by the user terminal, the second unique identifier to the user; and
  the processing of the payment transaction comprising:
    performing, by the user of the user terminal, a second authentication process to the second system based on the second unique identifier; and
    conducting, by the user of the user terminal, the payment transaction using the stored first unique identifier.

20. The method of claim 19, wherein the second unique identifier comprises a username to be associated with a second system password to define credentials for use in the second system.

* * * * *